US012744588B2

(12) United States Patent
Mukae

(10) Patent No.: US 12,744,588 B2
(45) Date of Patent: Sep. 22, 2026

(54) COMMUNICATION SATELLITE SYSTEM, EARTH-SIDE CONTROL FACILITY, GROUND FACILITY, ARTIFICIAL SATELLITE, COMMUNICATION GROUND CENTER, AND TRANSMISSION ROUTE SEARCH DEVICE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 790 days.

(21) Appl. No.: 18/036,899

(22) PCT Filed: Jul. 28, 2021

(86) PCT No.: PCT/JP2021/027824
§ 371 (c)(1),
(2) Date: May 15, 2023

(87) PCT Pub. No.: WO2022/137622
PCT Pub. Date: Jun. 30, 2022

(65) Prior Publication Data

US 2023/0421246 A1 Dec. 28, 2023

(30) Foreign Application Priority Data

Dec. 22, 2020 (WO) .................. PCT/JP2020/047941

(51) Int. Cl.
*H04B 10/00* (2013.01)
*B64G 1/10* (2006.01)
(Continued)

(52) U.S. Cl.
CPC ....... *H04B 7/18521* (2013.01); *B64G 1/1007* (2013.01); *B64G 1/1085* (2013.01);
(Continued)

(58) Field of Classification Search
CPC . H04B 10/118; H04B 10/112; H04B 10/1123; H04B 10/1125; H04B 10/114;
(Continued)

(56) References Cited

U.S. PATENT DOCUMENTS

| | | | | |
|---|---|---|---|---|
| 6,708,029 B2 * | 3/2004 | Wesel | ................ | H04B 7/18578 455/12.1 |
| 11,626,923 B2 * | 4/2023 | Sullivan | ............. | H04B 7/18584 455/12.1 |

(Continued)

FOREIGN PATENT DOCUMENTS

| | | |
|---|---|---|
| JP | 2013-541912 A | 11/2013 |
| JP | 2019-205156 A | 11/2019 |
| WO | 2020/240826 A1 | 12/2020 |

OTHER PUBLICATIONS

International Search Report mailed on Mar. 23, 2021, received for PCT Application PCT/JP2020/047941, filed on Dec. 22, 2020, 5 pages including English Translation.

(Continued)

*Primary Examiner* — Hanh Phan
(74) *Attorney, Agent, or Firm* — XSENSUS LLP

(57) ABSTRACT

In a communication satellite system (10), communication satellites (20) that fly on respective orbital planes such as an orbit (A), an orbit (B), and an orbit (C) each include a fore-aft communication device for communicating with other communication satellites (20) flying in front of and behind that communication satellite (20). Each of the communication satellites (20) flying in each orbit forms cross-link communication with communication satellites (20) in adjacent orbits at the northern edge of the orbit, indicated by a range (72), and the southern edge of the orbit, indicated by a range (73), using the fore-aft communication device. Thus,
(Continued)

communication between orbits becomes possible only with the fore-aft communication device.

20 Claims, 16 Drawing Sheets

(51) Int. Cl.
*H04B 7/185* (2006.01)
*H04B 7/195* (2006.01)
*H04B 10/118* (2013.01)

(52) U.S. Cl.
CPC ......... *H04B 7/18517* (2013.01); *H04B 7/195* (2013.01); *H04B 10/118* (2013.01)

(58) Field of Classification Search
CPC ....................... H04B 10/1143; H04B 10/1149; H04B 10/40; H04B 10/116; H04B 10/29; H04B 7/18521; H04B 7/18517; H04B 7/18513; H04B 7/18519; B64G 1/1085; B64G 1/1007
USPC ....... 398/118, 119, 120, 121, 122, 123, 124, 398/125, 126, 127, 128, 129, 130, 131, 398/135, 136, 45, 48, 49, 33, 38, 25, 115; 455/3.01, 3.02, 12.1, 13.1, 13.2, 427, 445
See application file for complete search history.

(56) References Cited

U.S. PATENT DOCUMENTS

| | | | | |
|---|---|---|---|---|
| 2012/0263042 | A1 | 10/2012 | Natarajan et al. | |
| 2016/0065308 | A1* | 3/2016 | Coleman | H04B 10/118 398/79 |
| 2019/0306778 | A1 | 10/2019 | Scott | |
| 2022/0177164 | A1 | 6/2022 | Mukae | |

OTHER PUBLICATIONS

International Search Report mailed on Oct. 26, 2021, received for PCT Application PCT/JP2021/027824, filed on Jul. 28, 2021, 5 pages including English Translation.

* cited by examiner

INCLINED CIRCULAR ORBITS 24 ORBITAL PLANES
NORTH POLE
600
12

10
A
B
C
D
9A
E
9B
8D
9C
8E
9D
9E
9F
2, 72
8F
1, 71
Tokyo
20
6D
5D
81
4D
7D
7F
7E
F
3D
3F
3, 73
1D
1E
2D
1F
2E
2F
3E Tokyo
A
B
C
D
E
F
G
H
I
74
1D
1E
1F
2D
2E
2F
3D
3E
3F
4D
5A
5B
5C
5D
5E
5F
5G
5H
5I
6D
7D
7E
7F
8D
8E
8F
9D
9E
9F
20
30
81

FORWARDING DIRECTION
EARTH DIRECTION
EARTH DIRECTION
20
51
51B
51C
51D
52
52B
52C
52D
18
X
Y
Z

↑FORWARDING DIRECTION

←EARTH DIRECTION

↑EARTH DIRECTION 10
2, 72
1, 71
3, 73
8F
7F
7E
F
9F
9E
9D
8E
9C
8D
9B
E
9A
D
20M
C
B
A
7D
6D
5D
20
4D
3F
81
3D
Tokyo
3E
2F
2E
1F
2D
1E
1D

Fig. 12

Tokyo
20M
20
30
74
81
A
B
C
D
E
F
G
H
I
1D
1E
1F
2D
2E
2F
3D
3E
3F
4D
5A
5B
5C
5D
5E
5F
5G
5H
5I
6D
7D
7E
7F
8D
8E
8F
9D
9E
9F 10
11
20M
91 SATELLITE
92
EDGE SERVER
COMPUTER (ARTIFICIAL INTELLIGENCE)
93
USER
510
511
GROUND DATA CENTER
GROUND FACILITY
EARTH
600
FLYING OBJECT INFORMATION
ORBIT INFORMATION
PRELIMINARY INFORMATION

COMMUNICATION SATELLITE SYSTEM, EARTH-SIDE CONTROL FACILITY, GROUND FACILITY, ARTIFICIAL SATELLITE, COMMUNICATION GROUND CENTER, AND TRANSMISSION ROUTE SEARCH DEVICE

CROSS-REFERENCE TO RELATED APPLICATIONS

The present application is based on PCT filing PCT/JP2021/027824, filed Jul. 28, 2021, which claims priority from PCT filing PCT/JP2020/047941, filed Dec. 22, 2020, the entire contents of each are incorporated herein by reference.

TECHNICAL FIELD

The present disclosure relates to a communication satellite system for transmitting information.

BACKGROUND ART

In prior arts, there has been a disclosure of virtual routing by a communication satellite constellation with inclined orbits (Patent Literature 1, for example).

For a communication satellite constellation with inclined orbits, the following communication satellite constellation is conceivable. The communication satellite constellation has a large number of orbital planes of inclined circular orbits with multiple communication satellites thereon, where one communication satellite forms communication cross-links with communication satellites on the same orbital plane and adjacent orbits to create a mesh communication network. However, it is technically challenging for one communication satellite to establish and maintain simultaneous communication lines with four separate communication satellites through front, back, right, and left, or four, communication devices at a time.

CITATION LIST

Patent Literature

Patent Literature 1: JP 2019-205156

SUMMARY OF INVENTION

Technical Problem

An object of the present disclosure is to provide a communication satellite system that can perform communication between orbits by providing each of communication satellites flying on the respective orbital planes with a fore-aft communication device for communication with the communication satellites that fly in front of and behind that communication satellite.

Solution to Problem

A communication satellite system includes:

a plurality of artificial satellites that fly in inclined circular orbits of six or more orbital planes, respectively, the orbital planes having a common orbital inclination and having azimuth components of normal vectors of the orbital planes offset from each other in east-west direction, wherein the plurality of artificial satellites include eight or more artificial satellites on each of the orbital planes, each of the artificial satellites on each of the orbital planes includes a fore-aft communication device which is communication devices oriented forward in a flying direction on the orbital plane and rearward in the flying direction, each of the artificial satellites on each of the orbital planes forms a first communication network covering an entire circumference of the inclined circular orbit by forming cross-link communication with an artificial satellite flying in front in the flying direction and an artificial satellite flying behind in the flying direction via the fore-aft communication device, and each of the artificial satellites on each of the orbital planes passes over each of a northern edge of the inclined circular orbit and a southern edge of the inclined circular orbit in synchronization with artificial satellites on other orbital planes, forms a second communication network by forming, when passing over the northern edge of the inclined circular orbit, cross-link communication with artificial satellites passing over the northern edges of the inclined circular orbits that are contained in adjacent orbital planes via the fore-aft communication device, the adjacent orbital planes being orbital planes neighboring said orbital plane that contains said inclined circular orbit, and forms a third communication network by forming, when passing over the southern edge of the inclined circular orbit, cross-link communication with artificial satellites passing over the southern edges of the inclined circular orbits that are contained in the adjacent orbital planes via the fore-aft communication device.

Advantageous Effects of Invention

In the communication satellite system of the present disclosure, each of the communication satellites flying on the respective orbital planes forms cross-link communication with communication satellites in the adjacent orbits at a northern edge and a southern edge of the orbit using the fore-aft communication device. Thus, communication between orbits becomes possible only with the fore-aft communication device.

BRIEF DESCRIPTION OF DRAWINGS

FIG. 6 is a diagram of Embodiment 1, illustrating four orthogonal views of a laterally-oriented satellite.

FIG. 8 is a diagram of Embodiment 1, illustrating four orthogonal views of the communication satellite 20 including the ground communication device 61C and a user satellite communication device 62C.

FIG. 12 is a diagram of Embodiment 1, illustrating a mission satellite 20M with a mission device 90.

DESCRIPTION OF EMBODIMENTS

Figure 1:
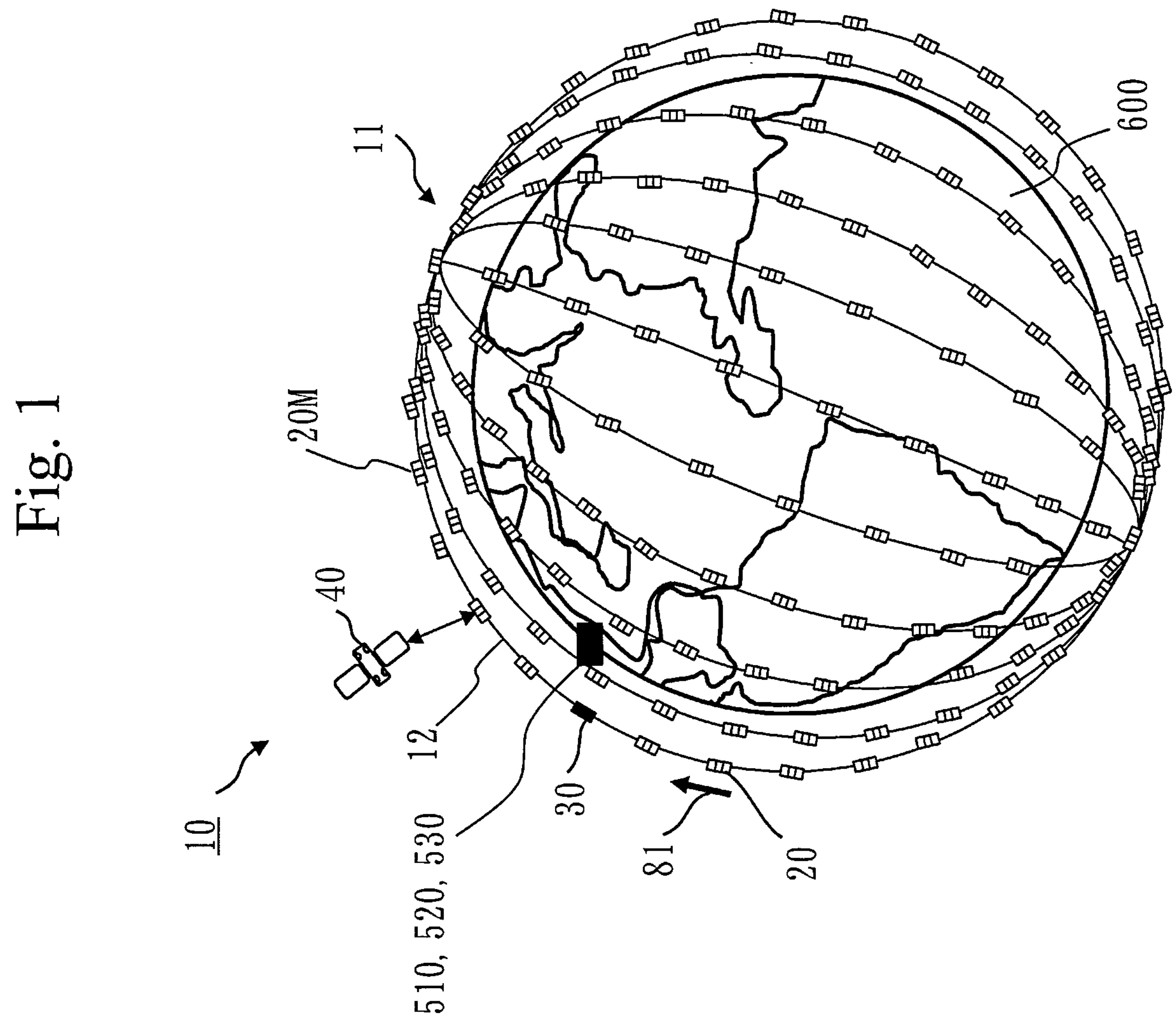
FIG. 1 is a diagram of Embodiment 1, illustrating a communication satellite system 10.

In the description of embodiments and drawings, the same and corresponding elements are given the same reference characters. Description of elements with the same reference characters will be omitted or simplified as appropriate. In the following embodiments, a "unit" may be read as "circuit", "step", "procedure", "process", or "circuitry" where appropriate.

Embodiment 1

Description of Structure

In the following embodiment, a forwarding direction and a geocentric direction of a communication satellite are defined as follows in FIGS. 5 to 8. A +X axis direction oriented to a plus direction in the right-handed coordinates is defined as a satellite forwarding direction +X of the satellite, and a +Z axis direction oriented to the plus direction in the right-handed coordinates is defined as a geocentric direction +Z of the satellite.

Referring to FIGS. 1 to 4, a communication satellite system 10 will be described. For the communication satellite system 10, orbits contained in orbital planes 12 are assumed to be inclined circular orbits.

<Communication Satellite System 10>

FIG. 1 shows the communication satellite system 10. The communication satellite system 10 is a system that relays and sends transmission information being transmitted.

The communication satellite system 10 includes multiple artificial satellites that fly in the inclined circular orbits of six or more orbital planes 12, respectively, the orbital planes 12 having a common orbital inclination and having azimuth components of normal vectors of the orbital planes offset from each other in east-west direction. FIG. 1 shows a relationship between the earth 600 and the multiple orbital planes 12. The multiple artificial satellites included in the communication satellite system 10 are communication satellites 20.

Figure 2:
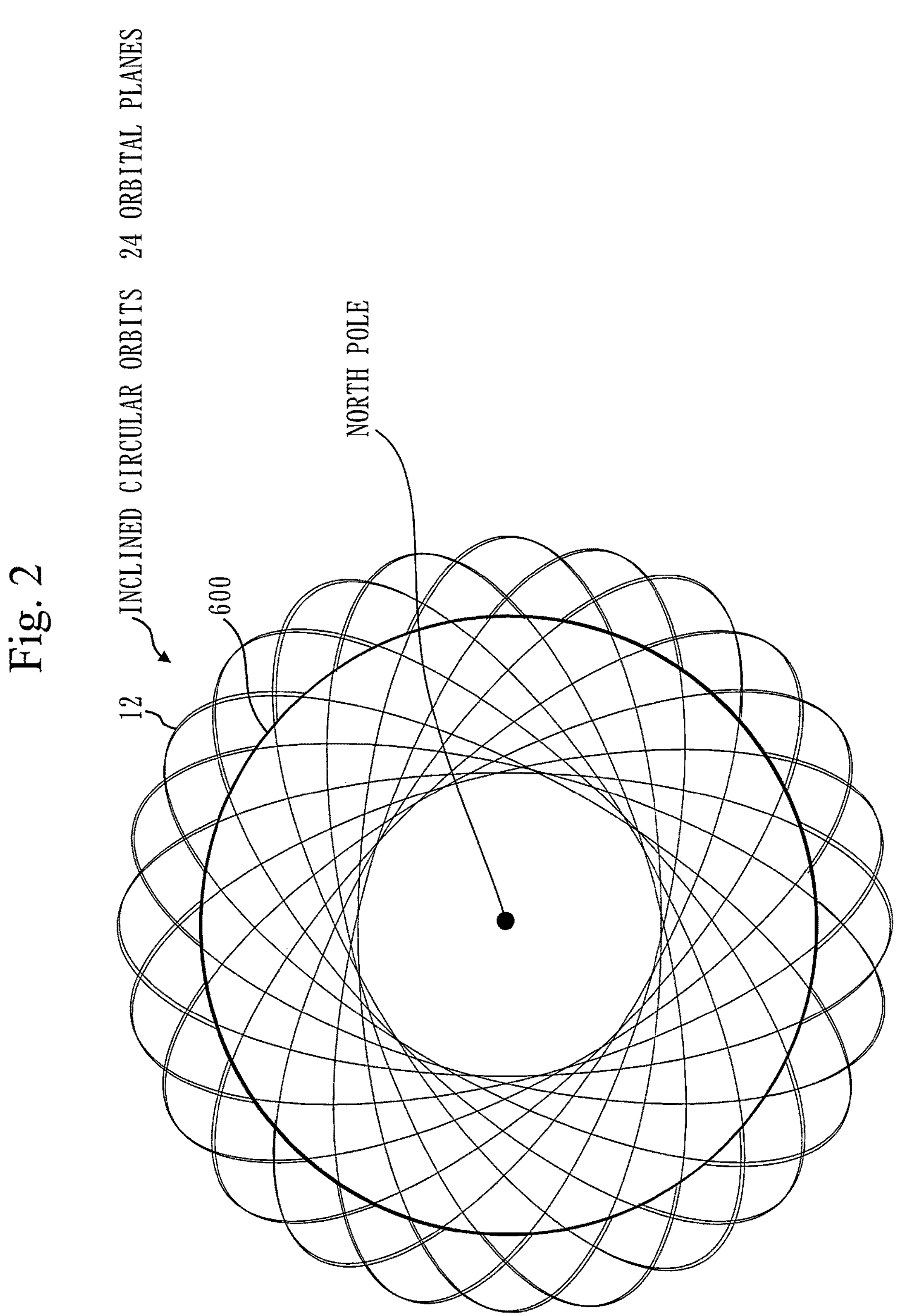
FIG. 2 is a diagram of Embodiment 1, illustrating inclined circular orbits of 24 orbital planes 12 as seen from the north pole side.

FIG. 2 is an illustration of the communication satellite system 10 having 24 orbital planes 12 as seen from the north pole side of the earth 600. The multiple communication satellites 20 included in the communication satellite system 10 include eight or more communication satellites 20 on each orbital plane 12. While, in FIG. 1, about 30 communication satellites 20 are deployed on one orbital plane 12, at least eight communication satellites 20 are to be deployed on the same orbital plane 12. In the communication satellite system 10, eight or more communication satellites 20 are deployed on the same orbital plane 12 and fly in the multiple orbital planes 12 which are six or more arranged adjacent to each other, thus forming a satellite constellation 11.

Figure 3:
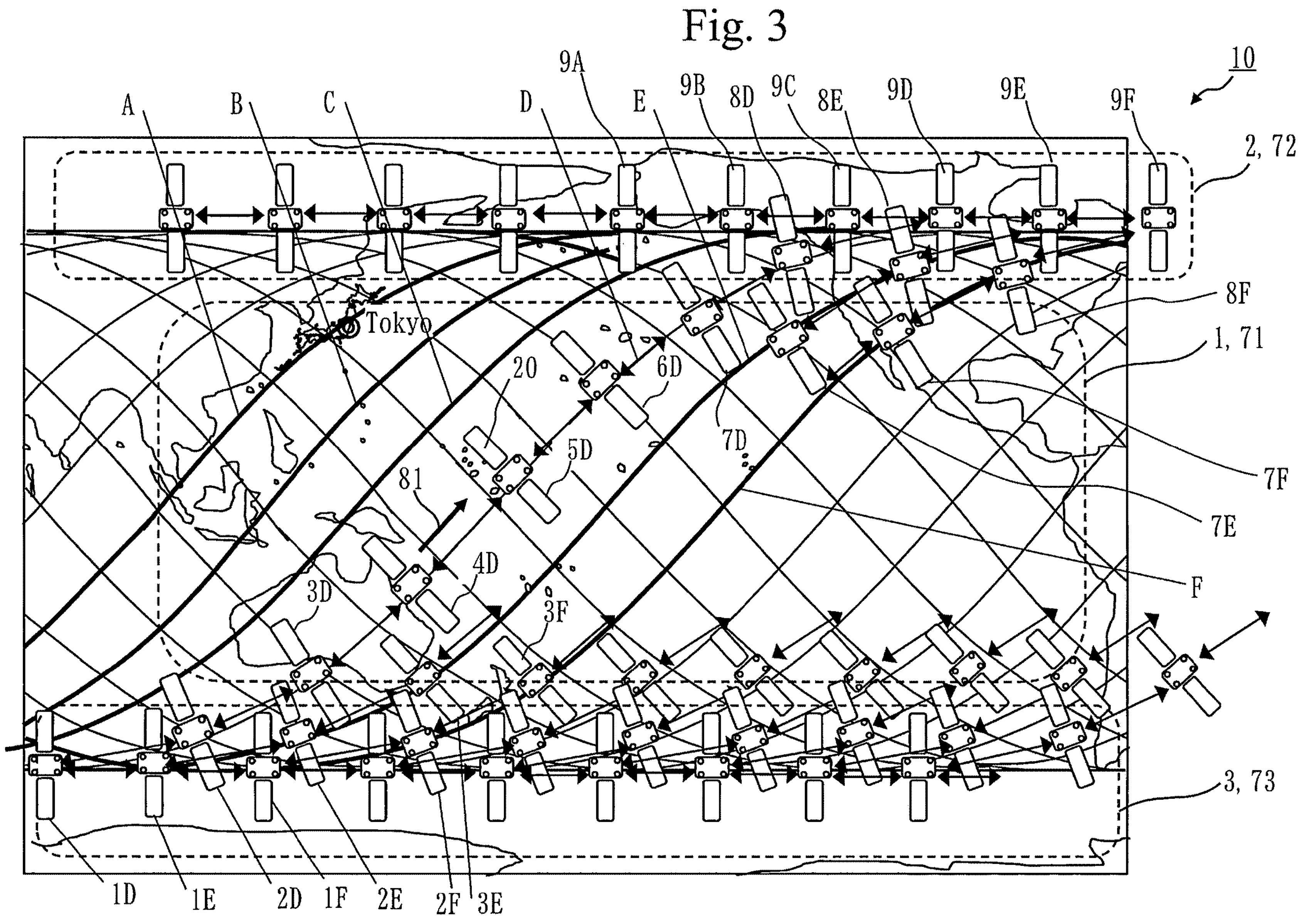
FIG. 3 is a diagram of Embodiment 1, illustrating an annular communication network 1, a northern edge communication network 2, and a southern edge communication network 3 in ground trace.

FIG. 3 shows an annular communication network 1, a northern edge communication network 2, and a southern edge communication network 3 in ground trace. The annular communication network 1 is a first communication network, the northern edge communication network 2 is a second communication network, and the southern edge communication network 3 is a third communication network. In FIG. 3, traces A to F are shown. Hereinafter, the trace A can be referred to as orbit A. The same applies to the other traces. The six or more orbital planes 12 of the communication satellite system 10 have a common orbital inclination. When there are six orbital planes 12, if the orbital inclination of one orbital plane 12 is 50 degrees, the orbital inclinations of the other five orbital planes 12 are also 50 degrees. That the orbital inclinations of the other five orbital planes 12 are also 50 degrees does not mean that they are exactly the same as "the orbital inclination of one orbital plane 12" but they can include errors, of course. In the communication satellite system 10, the angle of the orbital inclination is 40 degrees or more to 60 degrees or less. That is, when there are six orbital planes 12, if the orbital inclination of one orbital plane 12 is 40 degrees, that is, the lower limit, the orbital inclinations of the other five orbital planes 12 are also 40 degrees, and if the orbital inclination of one orbital plane 12 is 60 degrees, that is, the upper limit, the orbital inclinations of the other five orbital planes 12 are also 60 degrees.

<Annular Communication Network 1>

The communication satellites 20 on each orbital plane 12 each include a fore-aft communication device, which is communication devices oriented forward in a flying direction 81 and rearward in the flying direction 81 on the orbital plane 12. The fore-aft communication device is implemented by a first communication device 51C and a second communication device 52C, which will be discussed later. For the fore-aft communication device, optical communication devices can be used. That is, for the first communication device 51C and the second communication device 52C, optical communication devices can be used. Optical communication has the effects of having a large transmission capacity and enabling small, light-weight devices. In optical communication, it is necessary that communication satellites communicating with one another perform directivity control of optical communication beams with high accuracy. However, when a communication satellite performs communication with front and rear artificial satellites flying on the same orbital plane, directivity variations will be small because the relative relationship between the communication satellites is substantially maintained. Thus, optical communication in fore-aft communication on the same orbital plane can be implemented relatively easily, so the fore-aft communication can leverage the effects of optical communication. In FIG. 3, on the orbit D, a total of nine communication satellites 20 are present at positions 1D to 9D. On the other orbits, some of the nine communication satellites 20 are omitted. On the orbit D, the flying direction 81 of communication satellites 20 is shown. The flying direction 81 is northeast direction. The flying directions in the other orbits are the same as the flying direction 81.

As shown in FIG. 3, the respective communication satellites 20 on the orbital planes, indicated by the orbit A and so on, form the annular communication network 1 in the following manner. Specifically, each of the communication satellites 20 on each orbital plane forms the annular communication network 1 covering the entire circumference of the inclined circular orbit by forming cross-link communication with the communication satellite 20 flying in front in the flying direction 81 and the communication satellite 20 flying behind in the flying direction 81 using the fore-aft communication device.

This will be described more specifically. Consider the orbit D. In the orbit D, the communication satellite 20 at position 4D forms cross links with the communication satellite 20 at position 5D flying in front it in the flying direction 81 and the communication satellite 20 at position 3D flying behind it in the flying direction 81 via the fore-aft communication device. This is common to all of the communication satellites 20 that fly in the orbit D. A range 71 indicated by a dotted line is indicative of cross-link communication between front and rear satellites in the same orbital plane. Double arrows in the range 71 indicate cross-link communications. On the orbital plane 12 indicated by the orbit D, the annular communication network 1 covering the entire circumference of the inclined circular orbit of the orbital plane 12 is formed by cross-link communication between the communication satellites 20 flying in the inclined circular orbit of the orbital plane 12. The annular communication network 1 is also similarly formed in the other orbits.

<Range 72, Range 73>

A range 72 indicated by a dotted line in FIG. 3 indicates communication between adjacent orbits at the northern extremities of the inclined circular orbits of the orbital planes. The range 72 indicates the northern edge communication network 2. A range 73 indicated by a dotted line in FIG. 3 indicates communication between adjacent orbits at the southern extremities of the inclined circular orbits of the orbital planes. The range 73 indicates the southern edge communication network 3. In the communication satellite system 10, the communication satellites 20 on each orbital plane 12 pass over each of the northern edge of the inclined circular orbit and the southern edge of the inclined circular orbit in synchronization with the artificial satellites on the other orbital planes. Passing in synchronization means that, for the northern edge, the communication satellites 20 fly over the northern edges of their orbits at the same time on all the orbits, such as orbits A, B, C . . . , as shown in the range 72. For the southern edge, it means that the communication satellites 20 fly over the southern edges of their orbits at the same time on all the orbits, such as orbits A, B, C . . . , as shown in the range 73. In FIG. 3, communication satellites 20 at position 9A to position 9F are represented at the northern edge. The alphabet letters correspond with the alphabet letters indicating the orbits. The positions of communication satellites 20 to the left of the position 9A are omitted. In FIG. 3, positions 1D, 1E, and 1F are indicated at the southern edge. The positions of communication satellites 20 to the right of the position 1F are omitted.

<Northern Edge Communication Network 2>

The northern edge communication network 2 is now described. Each of the communication satellites 20 on each orbital plane forms the northern edge communication network 2 by forming, when passing over the northern edge of the inclined circular orbit, cross-link communication with the communication satellites 20 passing over the northern edges of the inclined circular orbits that are contained in adjacent orbital planes via the fore-aft communication device. Adjacent orbital planes refer to orbital planes neighboring the orbital plane that contains the inclined circular orbit. For example, the adjacent orbital planes for the orbit D are the orbital plane that contains the orbit C and the orbital plane that contains the orbit E. Each communication satellite 20 in the orbit D forms cross-link communication with the communication satellites 20 passing over the northern edges of the orbit C of one adjacent orbital plane and the orbit E of the other adjacent orbital plane, respectively, when passing over the position 9D of the northern edge of the orbit D. In the same manner, each communication satellite 20 passing over the northern edge of each orbit forms cross-link communication with the communication satellites 20 passing over the northern edges of its adjacent orbits.

Formation of such cross-link communication at the northern edge forms the northern edge communication network 2.

<Southern Edge Communication Network 3>

The southern edge communication network 3 is now described. Each of the communication satellites 20 on each orbital plane forms the southern edge communication network 3 by forming, when passing over the southern edge of the inclined circular orbit, cross-link communication with the communication satellites 20 passing over the southern edges of the inclined circular orbits that are contained in the adjacent orbital planes via the fore-aft communication device. For example, each communication satellite 20 in the orbit E forms cross-link communication with the communication satellites 20 passing over the southern edges of the orbit D of one adjacent orbital plane and the orbit F of the other adjacent orbital plane, respectively, when passing over the position 1E of the southern edge of the orbit E. In the same manner, each communication satellite 20 passing over the southern edge of each orbit forms cross-link communication with the communication satellites 20 passing over the southern edges of its adjacent orbits. Formation of such cross-link communication at the southern edge forms the southern edge communication network 3.

The northern edge communication network 2 and the southern edge communication network 3 are further discussed. There is a known communication satellite constellation concept that has a large number of orbital planes with many communication satellites thereon, where a communication satellite flying on one orbital plane forms communication cross-links with other communication satellites on the same orbital plane and other communication satellites in the adjacent orbits, thus creating a mesh communication network. Such a communication satellite constellation requires one communication satellite to establish and maintain simultaneous communication lines with separate communication satellites through front, back, right, and left, or four, communication devices at a time. It is, however, technically challenging to establish and maintain such communication lines.

Meanwhile, on an inclined circular orbit with an orbital inclination in the range of 40 degrees or more to 60 degrees or less, the flying direction of a communication satellite in the north-south direction reverses at the northern edge and southern edge of the orbital plane. This results in a situation where the communication satellite is temporarily flying from west to east. If in-orbital plane phases in which the communication satellites on the adjacent orbital planes fly are in synchronization when they pass over the northern extremity and the southern extremity of the orbital planes, it results in a situation where the communication satellites on all the orbital planes are flying from west to east at the time of passing over the northern and southern edges of the orbital planes.

Thus, at the time of passing over the northern and southern edges, cross-link communication with the communication satellites in the adjacent orbits can be formed by communication devices oriented forward and rearward in the forwarding direction. That is, in the northern edge communication network 2 and the southern edge communication network 3, communication with the adjacent orbits is possible only by means of communication devices that are oriented forward and rearward, which enables an inexpensive communication satellite system with a small total number of satellites.

Since it is also not necessary for one communication satellite to establish and maintain front, back, right, and left, or four, communication lines at a time, need for complicated and challenging techniques is eliminated. It goes without saying that when a communication satellite passes over the southern and northern edges of the orbital plane, a communication visual field angle corresponding to a relative satellite position change is secured for communication devices about the two axes of Azimuth and Elevation, as will be discussed later in FIG. 5.

For communication between communication satellites 20 in the adjacent orbits, radio wave communication devices can be used. For cross-link communication for formation of the northern edge communication network 2 and the southern edge communication network 3, radio wave communication devices can be used. Radio wave communication devices may also be used for right-left communication in a range 74 in FIG. 4, which will be discussed later. Cross-link communication for formation of the northern edge communication network 2 and the southern edge communication network 3 are as follows. Specifically, for the first communication device 51C and the second communication device 52C, radio wave communication devices can be used.

The radio wave communication devices form radio wave cross-links with the communication satellites in the adjacent orbits. Since, in communication between the adjacent orbits, the difference between the relative positions of communication satellites and the forwarding direction is large, radio wave communication, in which communication lines are easy to maintain even with any variation in communication visual field of a large angle, is advantageous.

Accordingly, use of radio wave communication devices has the effect of ensuring a long communication time between the adjacent orbits at the southern and northern edges of orbital planes to enable high capacity communication. In communication in the northern edge communication network 2 and the southern edge communication network 3, there are intersections of orbital planes before and after communication satellites 20 pass over the southern and northern edges of the orbital planes. This causes the communication direction to change by a large angle, thus breakdown of communication is an issue in optical communication. By contrast, radio wave communication has the effect of being able to continue communication between adjacent orbits without breakdown of communication. This results in the effect of enabling high capacity communication to be continued without waiting time for a satellite to fly by.

<Cross-Link Communication in Right-Left Direction>

Figure 4:
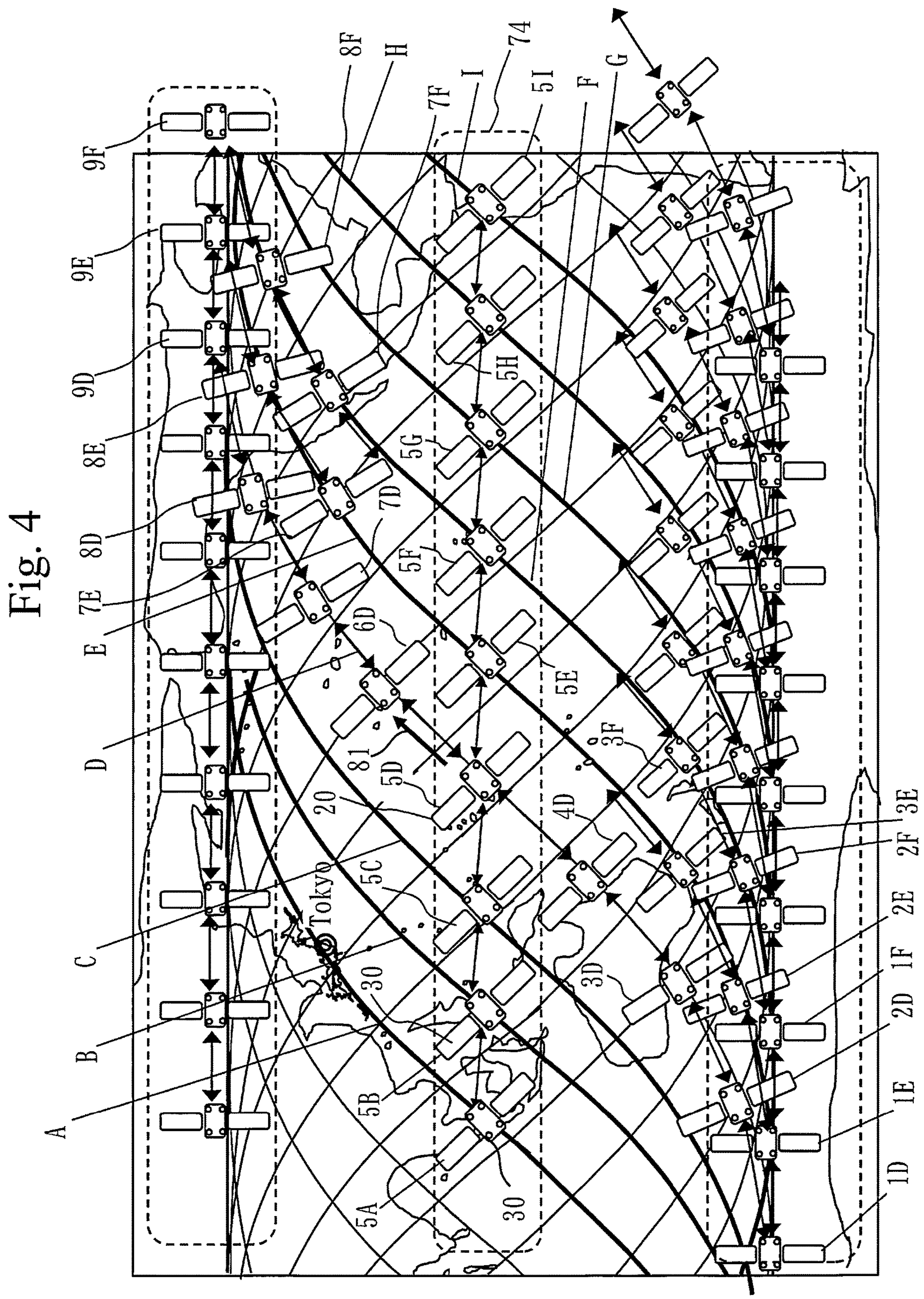
FIG. 4 is a diagram of Embodiment 1, illustrating cross-link communication in a right-left direction of the communication satellite system 10.

FIG. 4 shows cross-link communication in the right-left direction of the communication satellite system 10. FIG. 4 additionally includes the range 74 with respect to FIG. 3. In FIG. 4, the range 71 is omitted. The communication satellite system 10 includes, among the eight or more communication satellites 20 flying on the same orbital plane, a laterally-oriented satellite 30 equipped with a right-left communication device, which is communication devices oriented to the west side, or leftward in the flying direction 81, and to the east side, or rightward in the flying direction 81. The laterally-oriented satellite 30 is also a communication satellite 20. The laterally-oriented satellite 30 on each orbital plane forms cross-link communication with another laterally-oriented satellite 30 that is flying on the adjacent orbital plane on the left in the flying direction 81 and another laterally-oriented satellite 30 that is flying on the adjacent orbital plane on the right in the flying direction 81 via the right-left communication device, and communicates with them. The right-left communication device is implemented by a third communication device 53C and a fourth communication device 54C, which will be discussed later. On each orbit, at least one of the eight or more communication satellites 20 is the laterally-oriented satellite 30. The laterally-oriented satellite 30 will be discussed later. The range 74 indicated by a dotted line in FIG. 4 indicates lateral cross-link communication between adjacent orbits. Double arrows indicate cross-link communication. In the range 74, for position 5A on the orbit A, a situation where laterally-oriented satellites 30 are flying at position 5A to position 51 is shown. Taking the laterally-oriented satellite 30 at position 5B, for example, the laterally-oriented satellite 30 at the position 5B performs cross-link communication with the laterally-oriented satellite 30 at the position 5A on the orbit A, which is one adjacent orbit, and performs cross-link communication with the laterally-oriented satellite 30 at position 5C on the orbit C, which is the other adjacent orbit. In the communication satellite system 10 shown in FIG. 4, the laterally-oriented satellites 30 at the position 5 on all of the orbits perform cross-link communication with the laterally-oriented satellites 30 in their adjacent orbits.

As mentioned above, the communication satellite system 10 has the laterally-oriented satellites 30, which is oriented to the front, the rear, and the right and left sides in the flying direction, added between satellites on the orbital planes, such that the annular communication network in the orbital planes is reconstructed. In the communication satellite system 10, the laterally-oriented satellites 30 are added on all of the orbital planes, and a northern extremity passage timing and a southern extremity passage timing are synchronized among all of the orbital planes. In the communication satellite system 10, laterally-oriented satellites 30 flying in the adjacent orbits to each other are oriented to right and left. Forming a cross-link between adjacent orbits via the right-left communication device has the effect of reducing communication waiting time between the adjacent orbits.

<Communication Satellite 20>

Figure 5:
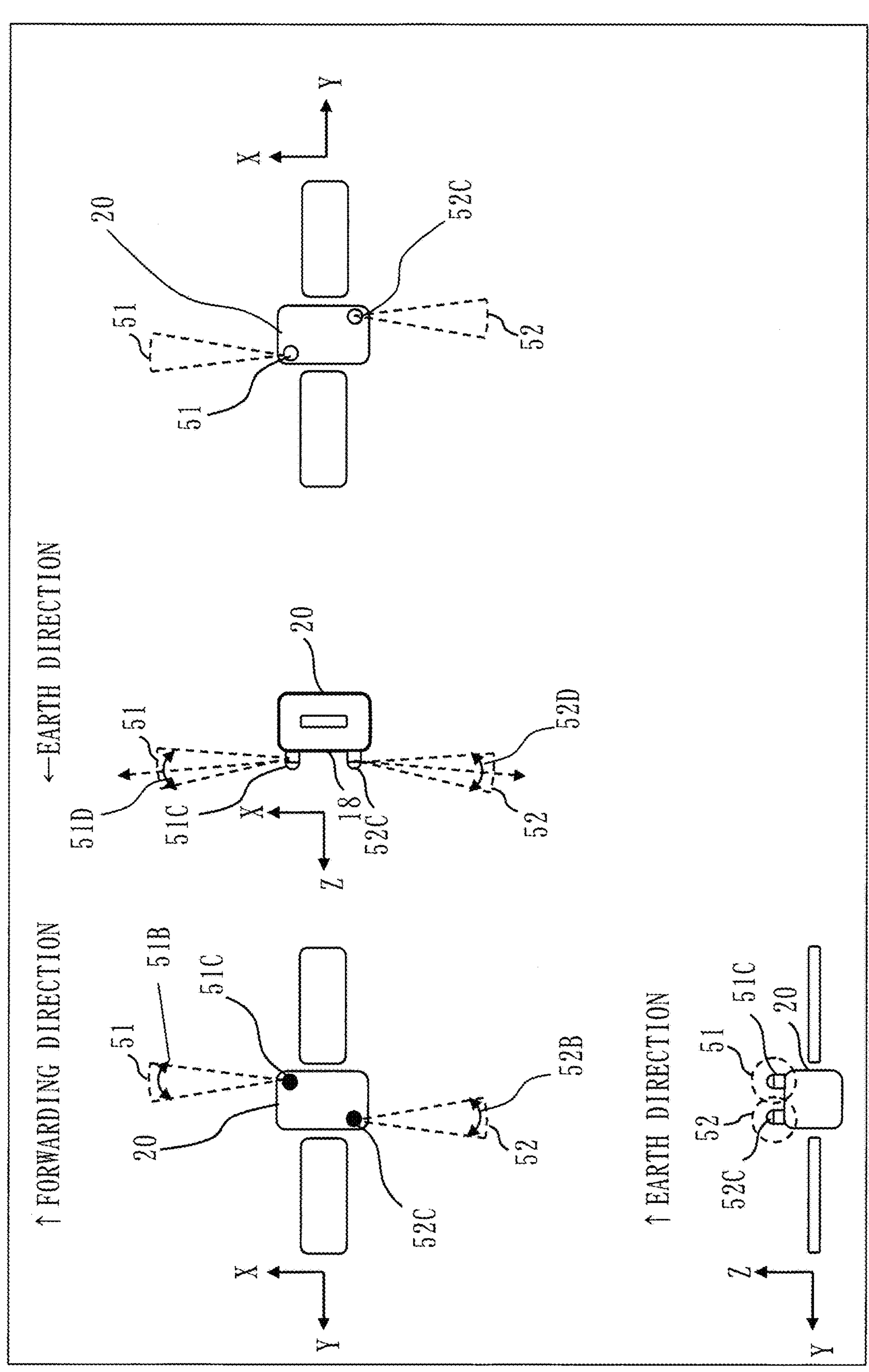
FIG. 5 is a diagram of Embodiment 1, illustrating four orthogonal views of a communication satellite 20.

FIG. 5 is four orthogonal views of the communication satellite 20. The communication satellite 20 includes the first communication device 51C and the second communication device 52C. As shown on the XZ plane in FIG. 5, the first communication device 51C and the second communication device 52C are arranged on an earth-oriented plane 18 facing the earth 600. The first communication device 51C and the second communication device 52C implement the fore-aft communication device.

In FIG. 5, a black circle on the XY plane indicates that the communication device can be actually viewed and a white circle indicates that the communication device cannot be actually viewed. The first communication device 51C is arranged forward in the forwarding direction of the communication satellite 20. The first communication device 51C has a communication visual field 51 in the forwarding direction of the communication satellite 20. The second communication device 52C is arranged rearward of the first communication device 51C with respect to the forwarding direction of the communication satellite 20. The second communication device 52C has a communication visual field 52 in the opposite direction to the forwarding direction of the communication satellite 20. As shown on the XY plane on the left side of FIG. 5, the first communication device 51C is capable of changing the communication visual field 51 within an Azimuth visual field change range 51B. The second communication device 52C is also capable of changing the communication visual field 52 within an Azimuth visual field change range 52B. As shown on the XZ plane in FIG. 5, the first communication device 51C is capable of Elevation rotation about a +Y axis in an Elevation visual field change range 51D. The second communication device 52C is capable of Elevation rotation about the +Y axis in an Elevation visual field change range 52D.

<Laterally-Oriented Satellite 30>

Figure 6:
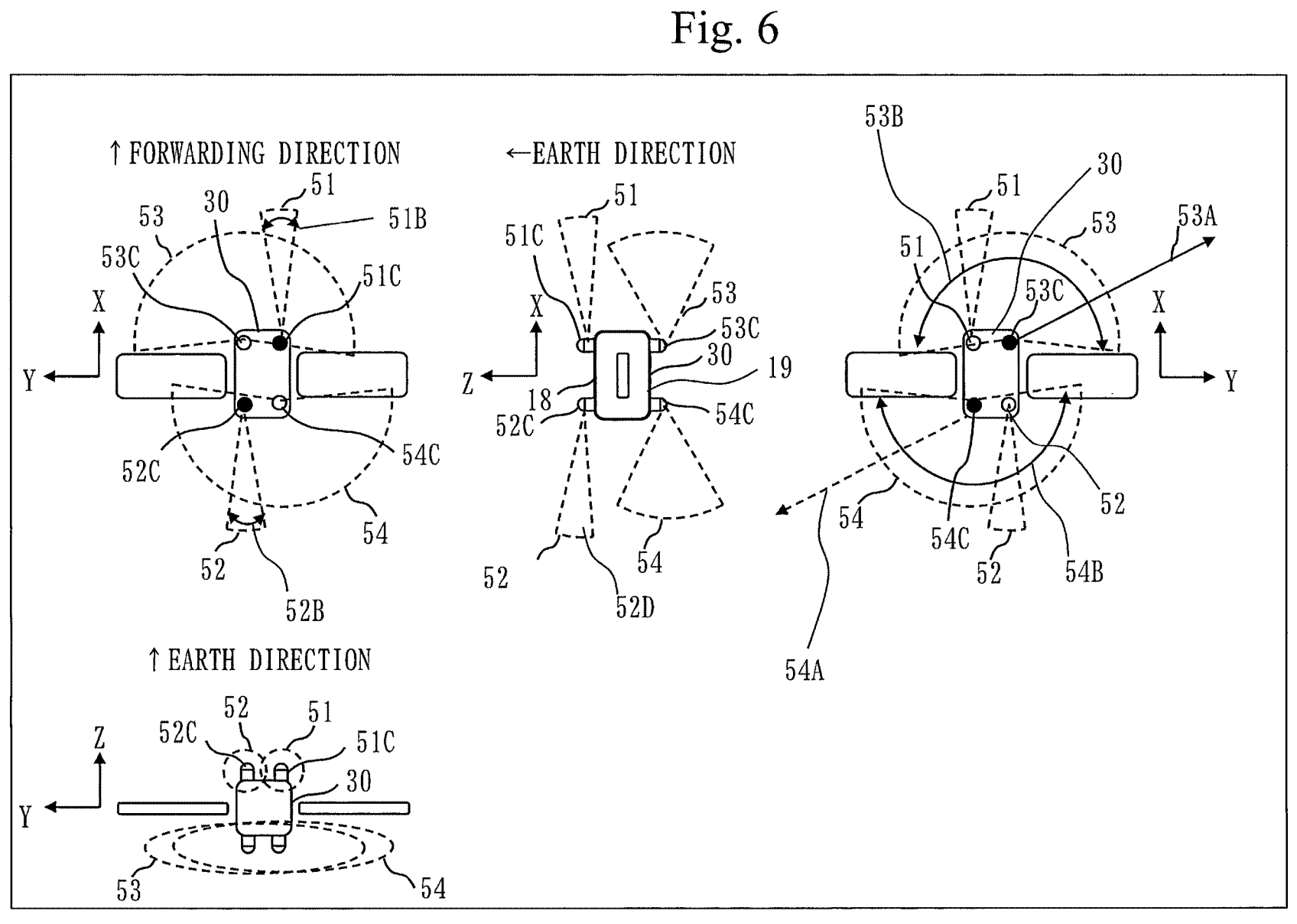

FIG. 6 is four orthogonal views of the laterally-oriented satellite 30. The laterally-oriented satellite 30 additionally includes the third communication device 53C and the fourth communication device 54C with respect to the communication satellite 20. As shown on the XZ plane in FIG. 6, the third communication device 53C and the fourth communication device 54C are arranged on a counter-earth-oriented plane 19, which is the back plane of the earth-oriented plane 18 and is oriented to the opposite direction of the geocentric direction +Z. The third communication device 53C and the fourth communication device 54C implement the right-left communication device. The third communication device 53C is arranged forward in the forwarding direction of the laterally-oriented satellite. The third communication device 53C has a communication visual field 53 forward in the forwarding direction of the laterally-oriented satellite. The third communication device 53C forms cross-link communication with the laterally-oriented satellite that flies in the orbit adjacent on the east side, or the right side, in a rightward communication direction 53A, which is northeast communication direction. The fourth communication device 54C is arranged rearward of the third communication device 53C with respect to the forwarding direction of the laterally-oriented satellite. The fourth communication device 54C has a communication visual field 54 in the opposite direction to the forwarding direction of the laterally-oriented satellite. The fourth communication device 54C forms cross-link communication with the laterally-oriented satellite that flies in the orbit adjacent on the west side, or the left side, in a leftward communication direction 54A, which is southwest communication direction.

<Azimuth>

The Azimuth communication visual field of the third communication device 53C is ±90 degrees or more with respect to the satellite forwarding direction +X. That is to say, an Azimuth visual field change range 53B of the third communication device 53C is ±90 degrees or more with respect to the satellite forwarding direction +X, as shown on the XY plane on the right side of FIG. 6. The Azimuth communication visual field of the fourth communication device 54C is ±90 degrees or more with respect to the opposite direction of the satellite forwarding direction +X. That is to say, an Azimuth visual field change range 54B of the fourth communication device 54C is ±90 degrees or more with respect to the opposite direction of the satellite forwarding direction +X.

<The Number of Communication Satellites that Fly on an Orbital Plane>

The number of eight or more communication satellites 20 that fly on the same orbital plane may be an odd number greater than 8. When the number of communication satellites 20 that fly on the same orbital plane is an odd number greater than 8, if multiple communication satellites 20 fly on a circular orbit at equal intervals, the passage timings of the communication satellites 20 will be different at the northern extremity and the southern extremity of the orbital plane. This leads to the effect of shortening communication waiting time to about a half.

<Air-to-Ground Communication Device>

Each communication satellite 20 on each orbital plane may include an air-to-ground communication device, as a communication device for communicating with a ground facility 510 that is provided in the range of a northern latitude of 40 degrees or more to a northern latitude of 60 degrees or less or in the range of a southern latitude of 40 degrees or more to a southern latitude of 60 degrees or less. In an inclined circular orbit with an orbital inclination of 40 degrees or more to 60 degrees or less, the flying direction in the north-south direction reverses at the south and northern edges of the orbital plane, which results in a situation where the communication satellite 20 is temporarily flying from west to east. In this case, a satellite congested zone where satellites fly from west to east is formed above an area on the ground surface within the range of a latitude of 40 degrees or more to 60 degrees or less. Accordingly, a ground facility located in the range of a northern latitude of 40 degrees or more to 60 degrees or less or in the range of a southern latitude of 40 degrees or more to 60 degrees or less can frequently form cross-link communication with the satellite constellation 11.

A ground communication device 61C is an air-to-ground communication device. FIG. 1 shows the ground facility 510.

Figure 7:
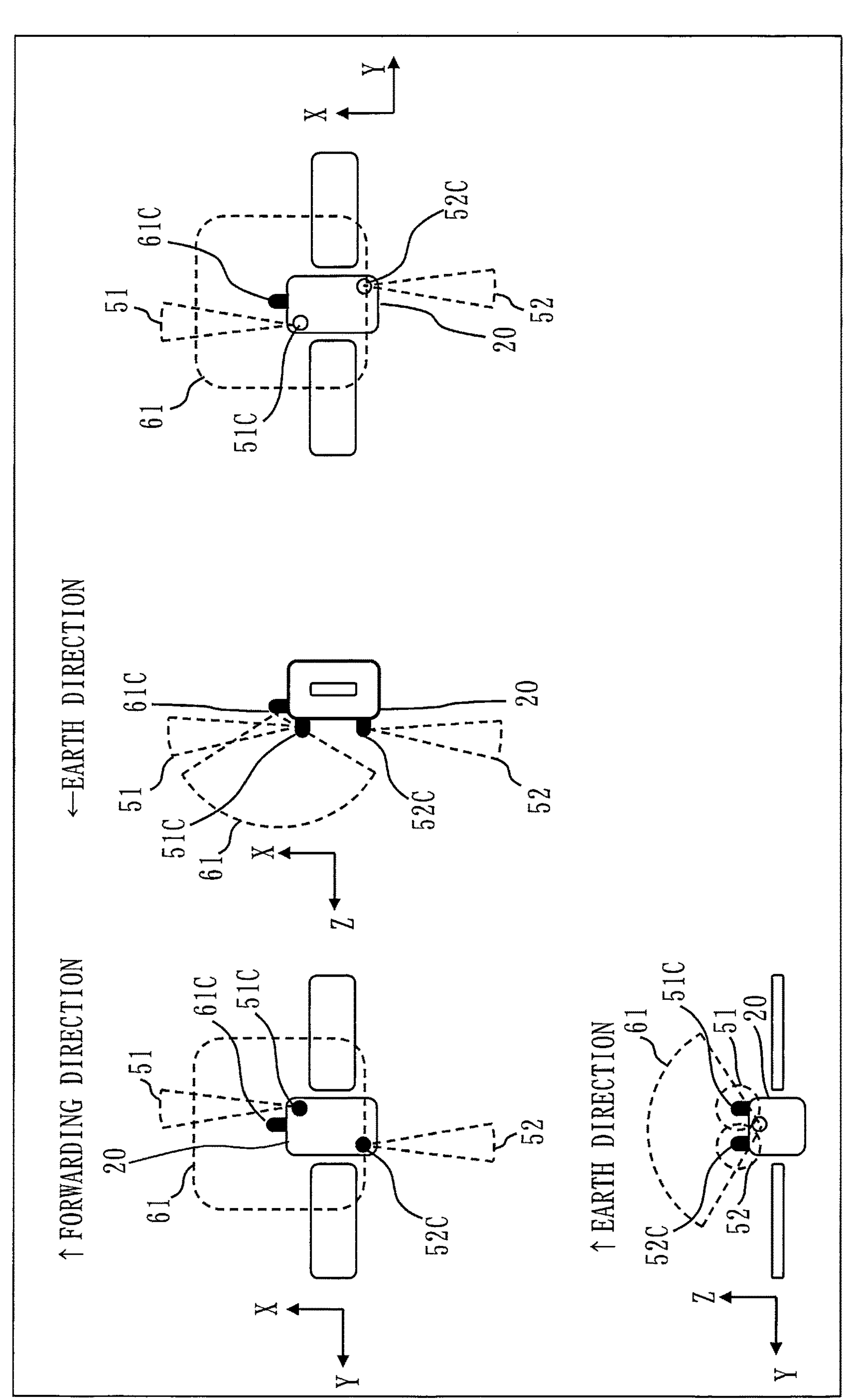
FIG. 7 is a diagram of Embodiment 1, illustrating four orthogonal views of the communication satellite 20 including a ground communication device 61C.

FIG. 7 is four orthogonal views of the communication satellite 20 including the ground communication device 61C. The communication satellite 20 of FIG. 7 additionally includes the ground communication device 61C with respect to the communication satellite 20 of FIG. 5.

As shown in FIG. 7, the ground communication device 61C is arranged further in the +X direction than the first communication device 51C and the third communication device 53C. A communication visual field 61 of the ground communication device 61C is oriented in the geocentric direction. The ground communication device 61C that communicates with the ground facility 510 may be either a radio wave communication device or an optical communication device.

The communication satellite 20 can include a user communication device for communicating with a communication device of a user over a user communication line.

Figure 8:
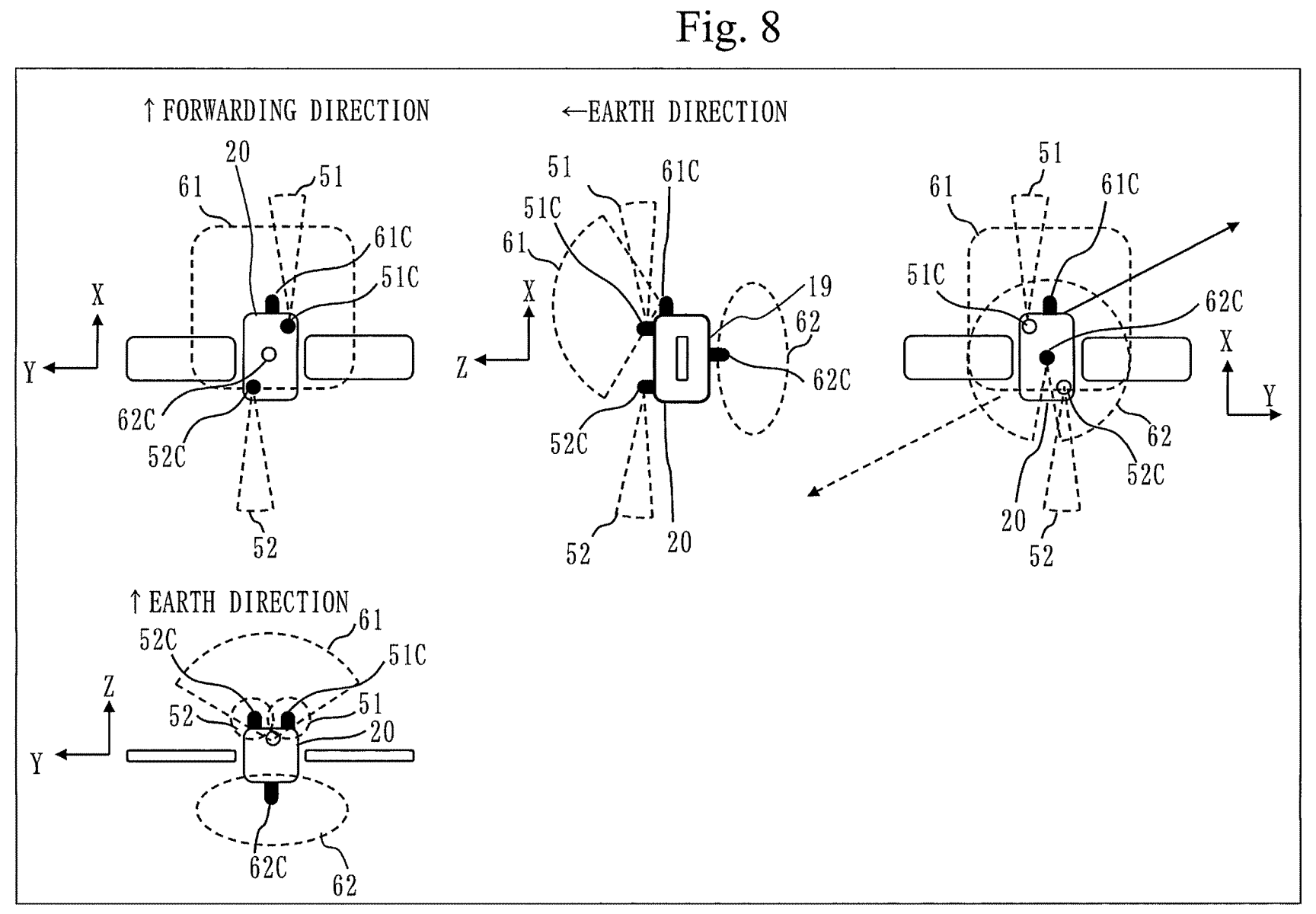

FIG. 8 is four orthogonal views of the communication satellite 20 including the ground communication device 61C and a user satellite communication device 62C. The communication satellite 20 of FIG. 8 additionally includes the user satellite communication device 62C with respect to the communication satellite 20 of FIG. 7. The ground communication device 61C and the user satellite communication device 62C can be used as user communication devices for communicating with a communication device of a user over a user communication line. The ground communication device 61C communicates with user communication devices present on lands, seas, and air of the earth 600. The user satellite communication device 62C communicates with a user communication device mounted on a user satellite 40, such as a surveillance satellite present in outer space. The user satellite communication device 62C is arranged on the side of the counter-earth-oriented plane 19, and a communication visual field 62 of the user satellite communication device 62C is oriented in the −Z direction, that is, the counter-earth side. In this manner, the communication satellite 20 includes user communication devices that communicate with communication line users. The user communication devices allow communication with moving objects such as observation satellites, aircrafts, ships, and vehicles, as well as ground facilities at certain locations on the ground. The user communication devices also enable communication with any target in outer space and on the ground.

<Earth-Side Control Facility 520>

Figure 9:
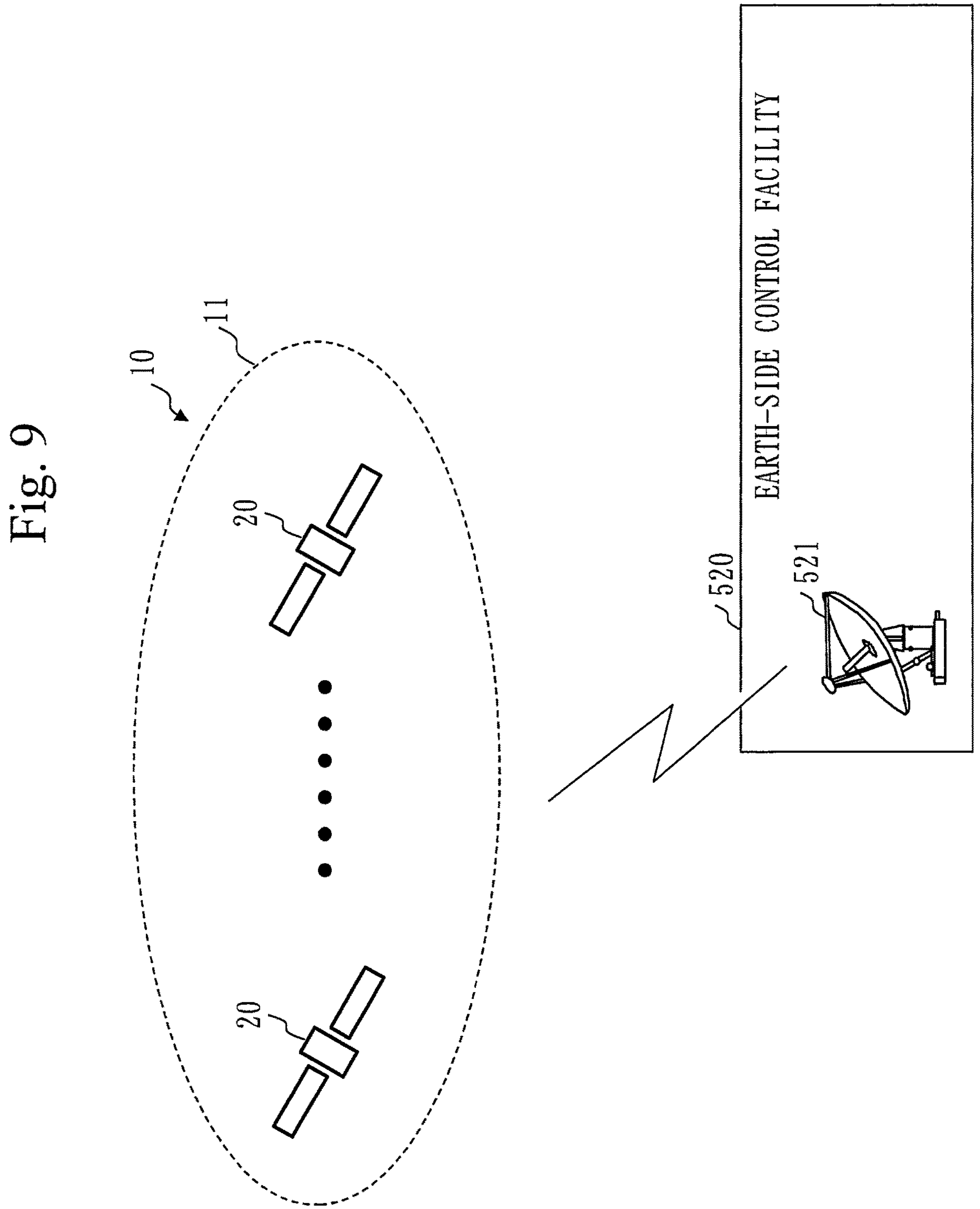
FIG. 9 is a diagram of Embodiment 1, illustrating an earth-side control facility 520 deployed on the earth.

FIG. 9 shows an earth-side control facility 520 deployed on the earth for controlling the multiple communication satellites 20 included in the communication satellite system 10. The earth-side control facility 520 is shown in FIG. 1. The earth-side control facility 520 can control the multiple communication satellites 20 using the annular communication network 1, the northern edge communication network 2, and the southern edge communication network 3 formed by the communication satellite system 10.

Figure 10:
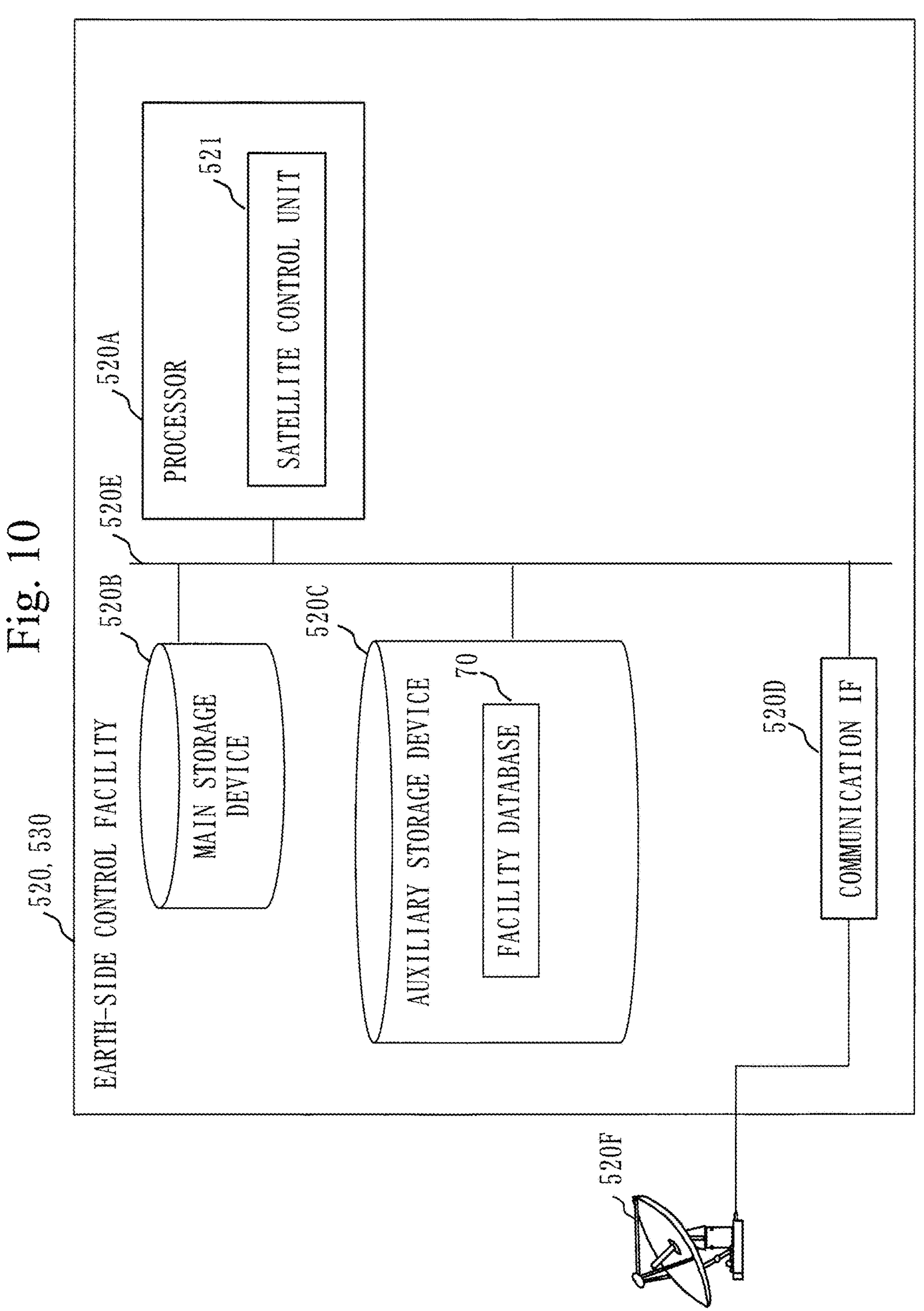
FIG. 10 is a diagram of Embodiment 1, illustrating a hardware configuration of the earth-side control facility 520.

FIG. 10 shows a hardware configuration of the earth-side control facility 520. As shown in FIG. 9, the earth-side control facility 520 controls the multiple communication satellites 20 included in the communication satellite system 10. As shown in FIG. 10, the earth-side control facility 520 includes hardware such as a processor 520A, a main storage device 520B, an auxiliary storage device 520C, and a communication interface 520D. The communication interface 520D is connected with a communication antenna 520F. The processor 520A is connected with the other pieces of hardware by a signal line 520E.

<Communication Ground Center 530>

A communication ground center 530 includes a transmission route search device, which selects one or more communication satellites 20 through which transmission information is to be routed from among the multiple communication satellites 20 as a transmission route for transmission information transmitted by at least one communication satellite 20 of the multiple communication satellites 20 included in the communication satellite system 10. The transmission route search device can be implemented by the earth-side control facility 520 shown in FIG. 10.

A satellite control unit 521 selects one or more communication satellites 20 through which transmission information is to be routed from among the multiple communication satellites 20, as a transmission route for transmission information transmitted by at least one communication satellite 20 of the multiple communication satellites 20 included in the communication satellite system 10. In the transmission route search device implemented at the earth-side control facility 520, the satellite control unit 521 searches for an optimal route as a transmission route with a shortest transmission time and determines a time of transmission of target information by each communication satellite included in the optimal route, by taking, as input, a transmission start time of the transmission information, position information for a source of the transmission information, and position information for a destination of the transmission information.

The communication ground center 530 transmits command signals to control the communication satellites 20 and conducts the operation of the communication satellite system 10. The communication ground center 530 includes a communication route search device. The communication route search device determines communication satellites through which information will be routed from the information source to the information destination, as well as an order of transmission among those communication satellites 20. The communication route search device takes a communication start time, position coordinates, and the position coordinates of a party to which the transmission information being transmitted will be sent as input data. The satellite control unit 521 of the earth-side control facility 520, serving as the communication route search device, searches for an optimal route of transmission, which is a sequence of satellite IDs of the communication satellites which should transmit the transmission information. The satellite control unit 521 generates, as a product, a series of satellite IDs, a list of expected times at which each communication satellite will transmit the transmission information to the next communication satellite, and commands to give communication instructions to the communication satellite group that will transmit the transmission information. The satellite control unit 521 includes, as objects of analysis for route search, a predicted error in an actual orbit of the flying position of a communication satellite 20 relative to its planned orbit, an error in a predicted time of passing through certain position coordinates, a delay due to transmission of transmission information, a satellite movement distance associated with the predicted error and the delay time, and relative positional change of nearby passing satellites associated with satellite movement, and searches for an optimal route on which the transmission information should be transmitted in a shortest amount of time.

<Mission Satellite 20M>

Figure 11:
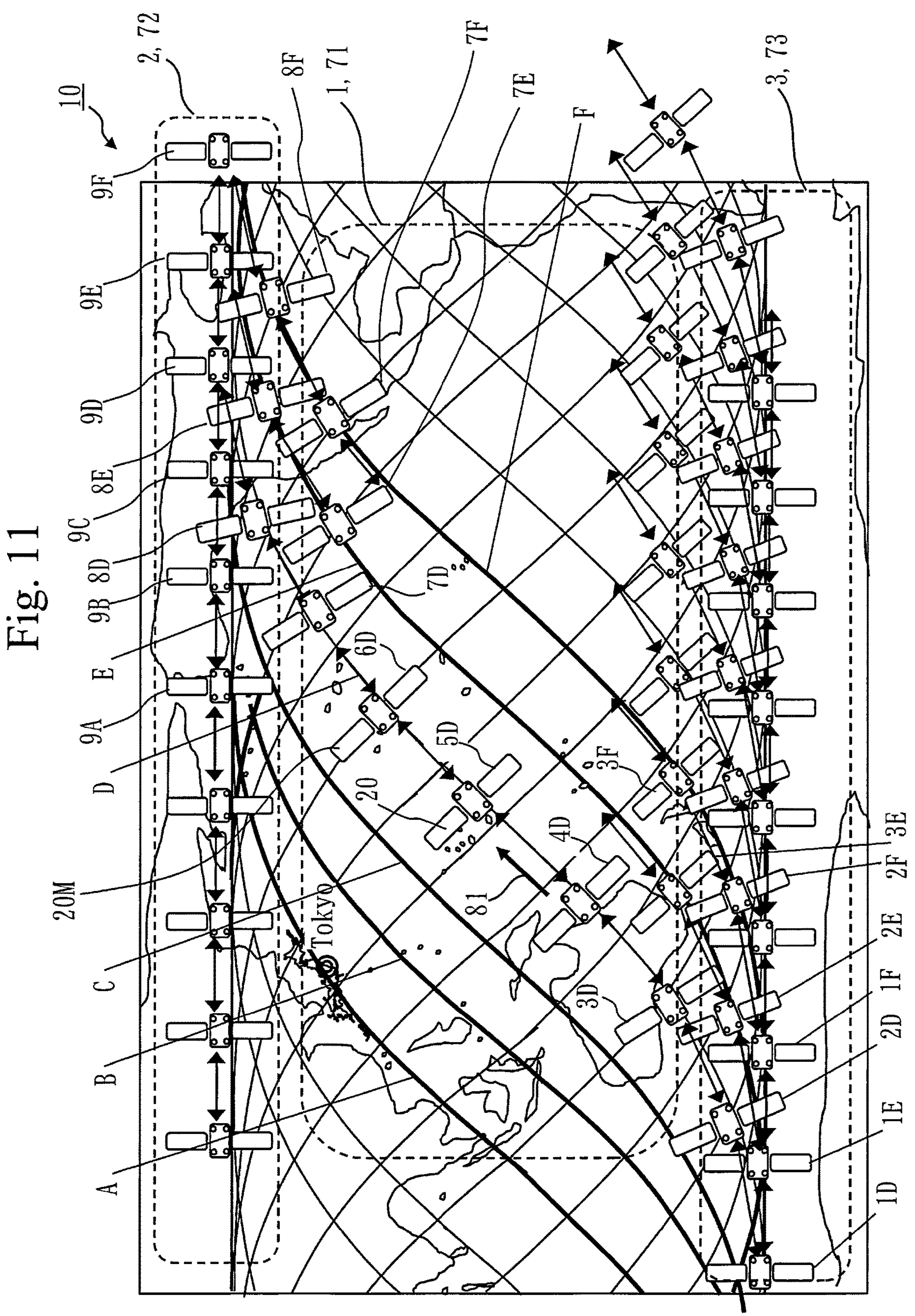
FIG. 11 is a diagram of Embodiment 1, illustrating the communication satellite system 10 with a mission satellite 20M.

FIG. 11 shows a configuration where the communication satellite system 10 shown in FIG. 3 includes a mission satellite 20M among the multiple communication satellites 20. The communication satellite system 10 can include at least one mission satellite 20M among the multiple communication satellites 20. FIG. 11 shows a situation where the mission satellite 20M is flying at position 6D on the orbit D. The mission satellite 20M is a communication satellite 20. The mission satellite 20M is a communication satellite 20 that performs a particular mission and is introduced between artificial satellites that fly in the same orbit in the satellite constellation 11. The mission satellite 20M further includes a mission device 90 in addition to the fore-aft communication device. That is, an artificial satellite equipped with the fore-aft communication device is a communication satellite 20; but if the communication satellite 20 further includes the mission device 90, the communication satellite 20 represents the mission satellite 20M. The mission device 90 is a device for performing a particular mission.

In FIG. 11, an annular communication network is formed as mentioned for FIG. 3. The multiple communication satellites 20 reconstructs and forms the annular communication network including the mission satellite 20M after the mission satellite 20M started flying among the multiple communication satellites 20.

As shown in FIG. 11, by introducing the mission satellite 20M to the configuration of the communication satellite system 10 in FIG. 3, information other than communication, specifically, information on a mission, can be transmitted by way of the annular communication network in real time. For example, the mission device 90 can be a communication device such as an observation device, a positioning device, and an information gathering device. The mission device 90 may also be a data relay device or a communication device that performs communication with various ground assets (including moving objects). Further, the mission device 90 may be any other device.

Figure 12:
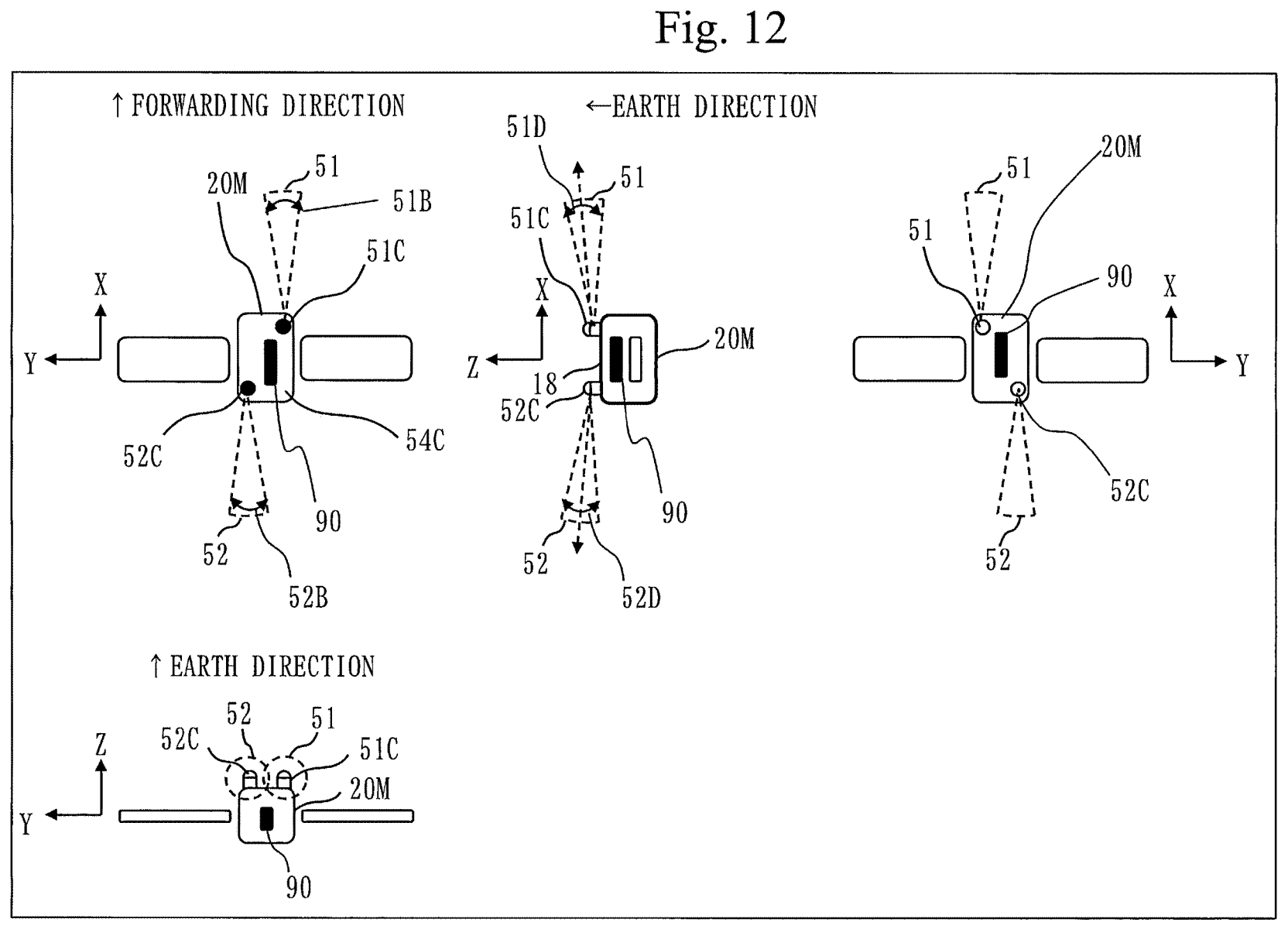

FIG. 12 shows a configuration of the mission satellite 20M. FIG. 12 indicates that the mission satellite 20M is formed by providing the communication satellite 20 of FIG. 5 with the mission device 90.

Figure 13:
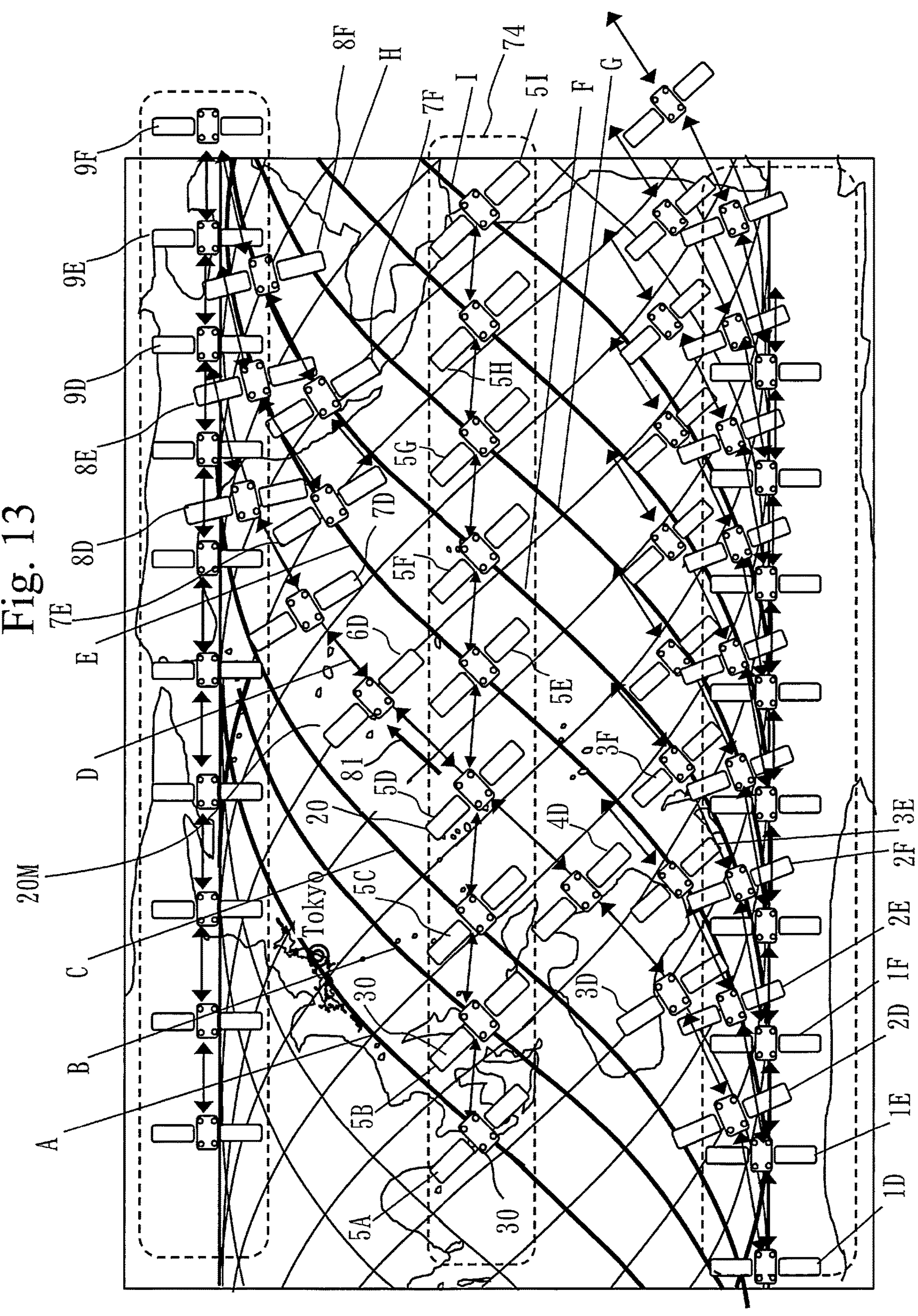
FIG. 13 is another diagram of Embodiment 1, illustrating the communication satellite system 10 with the mission satellite 20M.

FIG. 13 shows a configuration where the communication satellite system 10 shown in FIG. 4 includes the mission satellite 20M among the multiple communication satellites 20. The communication satellite system 10 can include at least one mission satellite 20M among the multiple communication satellites 20. FIG. 13 shows a situation where the mission satellite 20M is flying at the position 6D on the orbit D. In FIGS. 4 and 13, each communication satellite 20 on each orbit can form cross-link communication with the communication satellites 300 on the right and left adjacent orbital planes in the flying direction using the right-left communication device. A mesh communication network is thereby formed. In FIG. 13, the satellite constellation 11 of the communication satellite system 10 reconstructs and forms the annular communication network including the mission satellite 20M after the mission satellite 20M started flying among the artificial satellites, and reconstructs and forms the mesh communication network. The communication satellite system 10 shown in FIG. 13 enables information transmission for various missions across the entire globe.

Description of the Effects of Embodiment 1

In the communication satellite system 10 of Embodiment 1, each one of the communication satellites 20 flying on each orbital plane forms cross-link communication with the communication satellites 20 in the adjacent orbits using the fore-aft communication device at the northern edge and southern edge of the orbit. Thus, communication between orbits becomes possible only with the fore-aft communication device. Also, the mission satellite 20M allows information on a mission to be transmitted in real time by utilizing the annular communication network.

The communication satellite system 10 described in Embodiment 1 can also be viewed as a method of controlling the satellite constellation 11 by the earth-side control facility 520.

Modification of Embodiment 1

Figure 14:
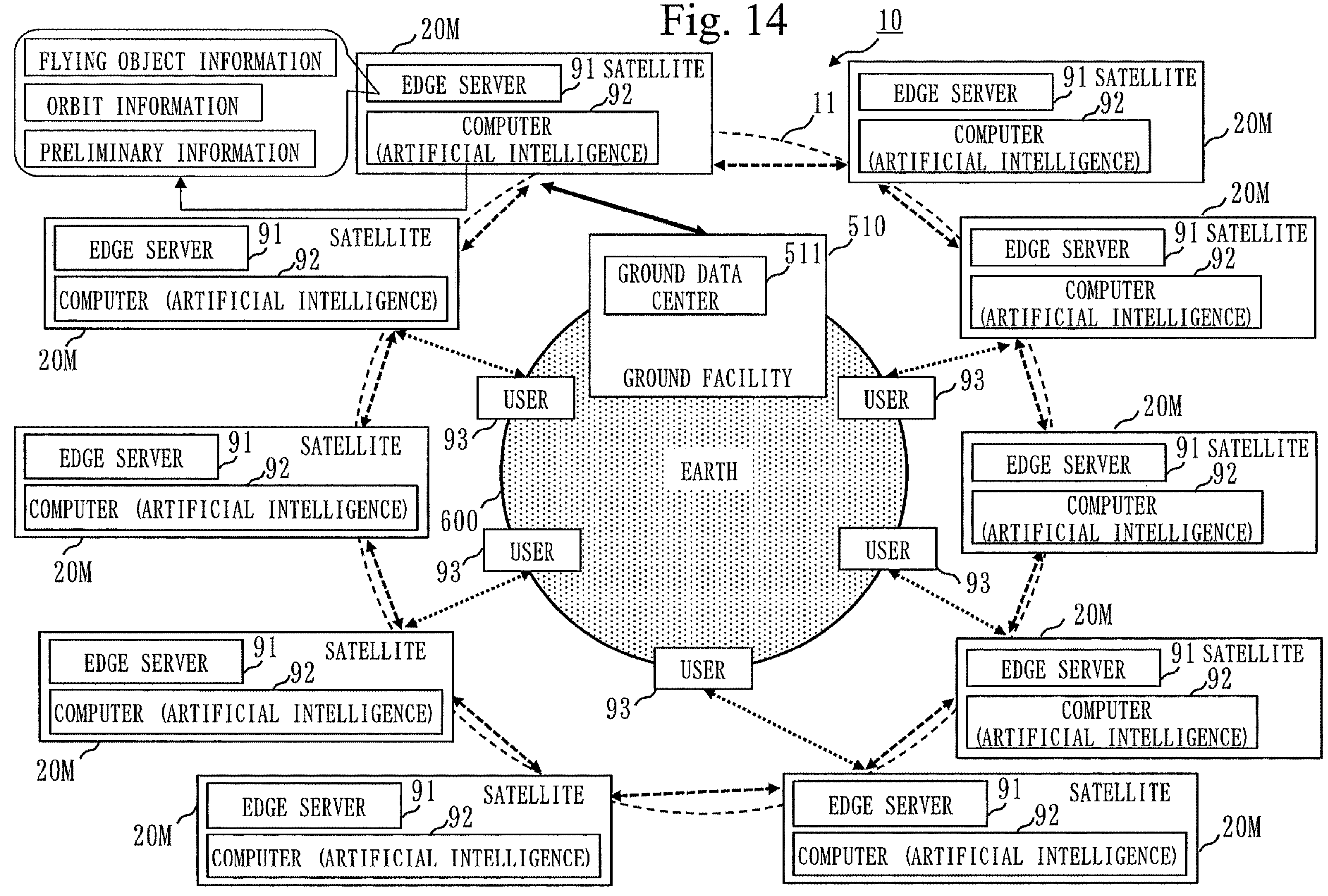
FIG. 14 is a diagram of Embodiment 1, illustrating a configuration for performing distributed computing processing on orbits.
Figure 15:
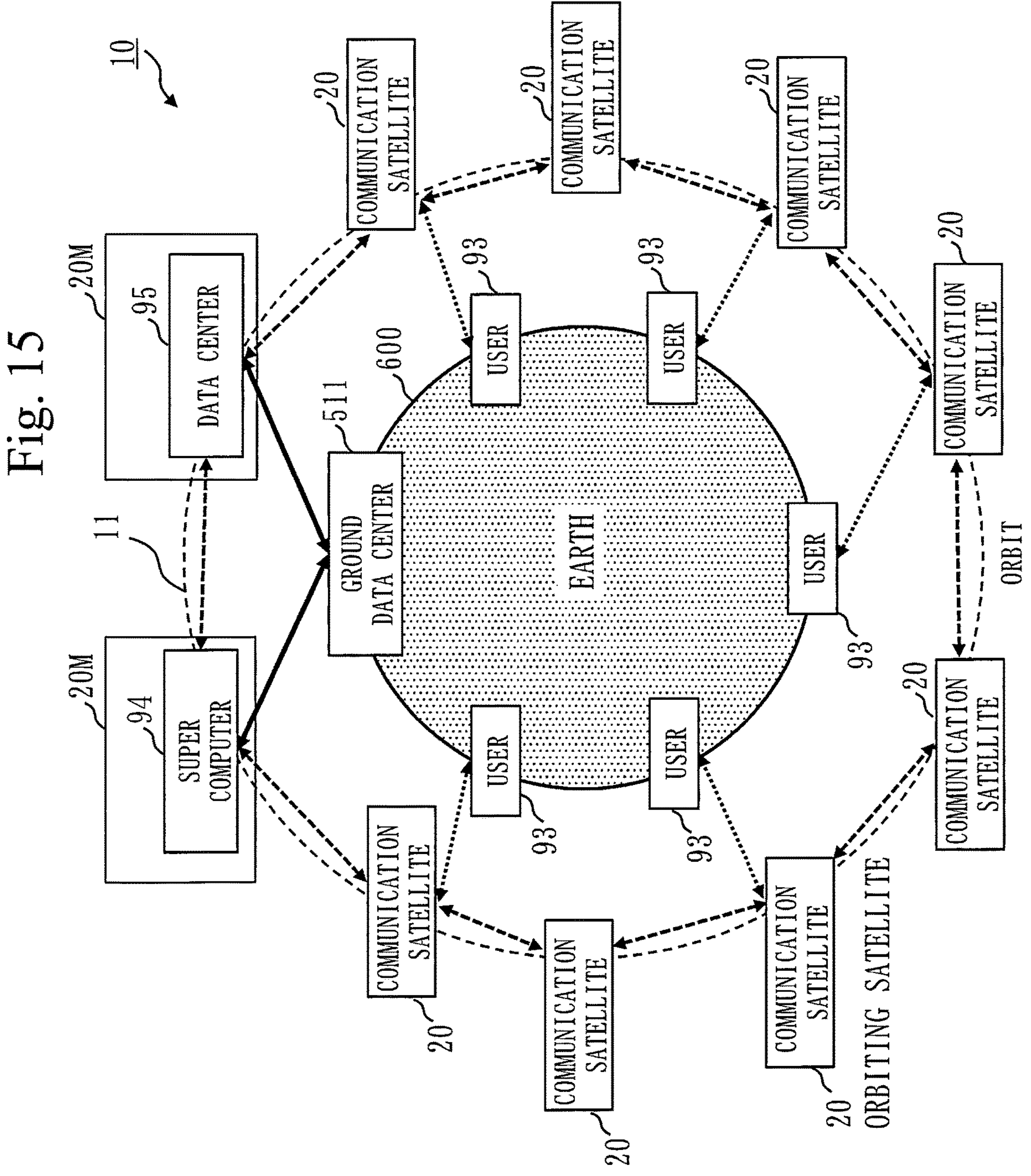
FIG. 15 is a diagram of Embodiment 1, illustrating a satellite constellation 11 including the mission satellites 20M.
Figure 16:
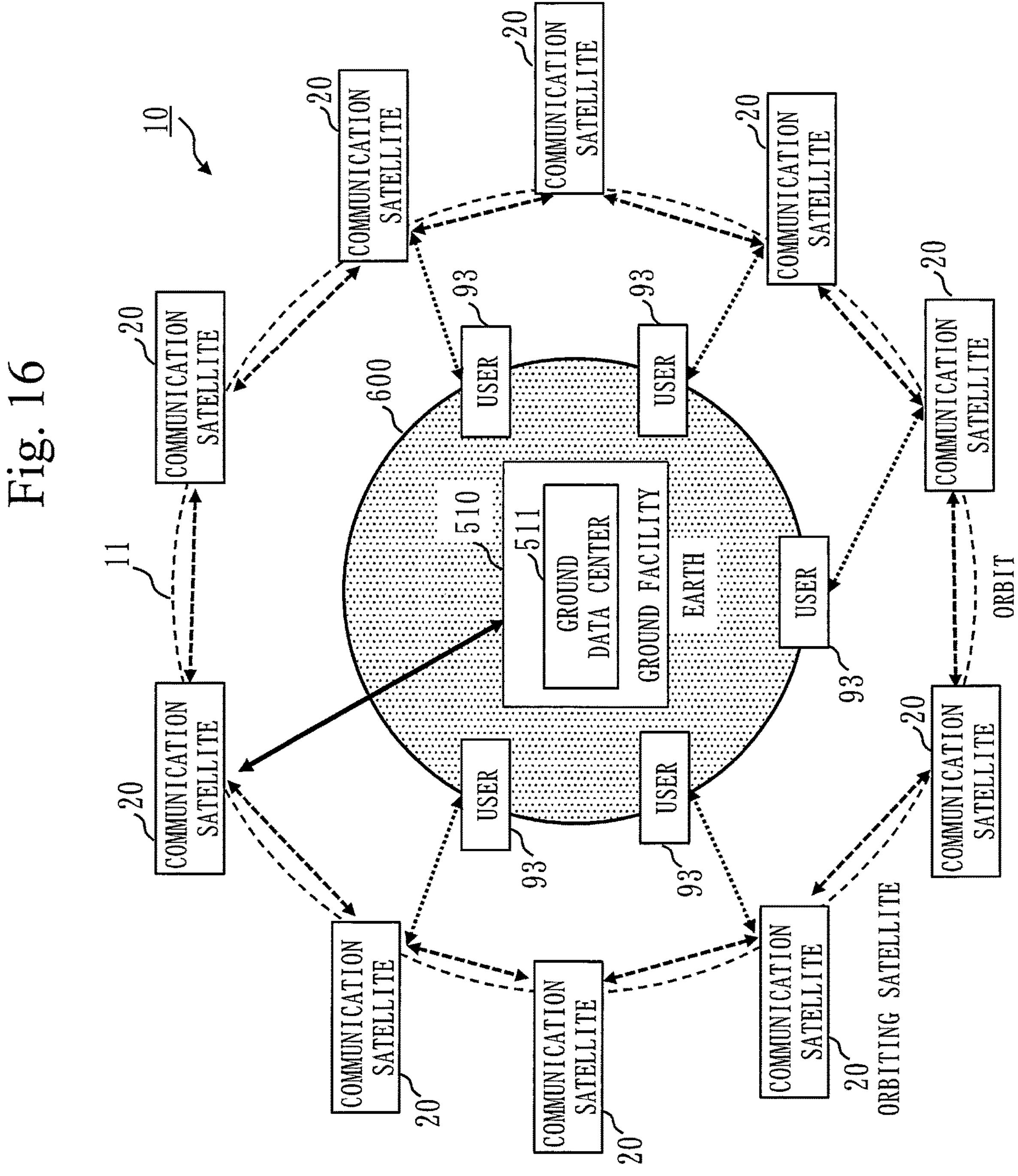
FIG. 16 is a diagram of Embodiment 1, illustrating a location of a ground facility 510.

Referring to FIGS. 14 to 16, a modification of Embodiment 1 (hereinafter, the modification) will be described. The modification relates to edge computing.

<Edge Server>

FIG. 14 shows a configuration where edge servers 91 are provided on the satellite constellation side and distributed computing processing is performed on the orbits. As shown in FIG. 14, the mission satellites 20M, which are artificial satellites equipped with the mission device 90 shown in FIG. 11 or 13, have each the edge server 91 and a computer 92 equipped with artificial intelligence mounted thereon as the mission device 90, and the mission satellites 20M executes edge computing on the orbits using the artificial intelligence and the edge servers 91. User terminals 93 on the ground are capable of communicating with the mission satellites 20M. Although FIG. 14 shows all of the satellites as being mission satellites 20M, this is for the sake of illustration. The satellite constellation 11 can include one or more mission satellites 20M.

As a way of realizing a distributed architecture, edge computing with edge servers on the IoT (Internet of Things) side has been of increasing interest.

In conventional IoT, a centralized mechanism where data collected by sensors is transmitted to a cloud over the internet and subjected to analysis has been common.

By contrast, edge computing employs an approach of performing data processing in a distributed manner among edge servers installed on devices themselves or between the devices and a cloud, thereby achieving real-time and low-load data processing.

Also, along with an increasing amount of information associated with development of an information society, increased power consumption and measures against exhaust heat have become issues. In a centralized mechanism in particular, power intensiveness and measures against exhaust heat of supercomputers and large-scale data centers have been significant problems.

In outer space, on the other hand, heat can be discharged into deep space by radiation cooling; hence, it is rational to have edge servers on the satellite constellation side and transmit only necessary data to the ground after performing distributed computer processing on the orbits. The communication satellite system shown in FIG. 11 or FIG. 13 has the effect that satellites situated in outer space send and receive information to/from a cloud, which is in the form of the ground facility 510 equipped with a ground data center 511, via an annular communication network or a mesh communication network to enable low latency and unified management of data.

Purposes for processing by distributed computing include (1) to (4) below:

(1) Reducing the load of ground processing by processing items that have been conventionally processed by cloud computing on the ground through on-orbit distributed computing;

(2) Reducing the amount of data to be transmitted to the ground by processing satellite information acquired by mission satellites by distributed computing on the orbits;

(3) Autonomous system management on the orbits, like in-system collision prevention in a satellite constellation; and (4) Eliminating transmission and reception of information to/from a ground system to allow faster determination, by quick processing of information acquired on the orbits at an emergency, like in a flying object tracking system, and distributed computing of information that should be reflected in the next step on the orbits through autonomous determination. Effects of distributed computing performed on the orbits by satellites analogous to IoT devices include (1) to (4) below:

(1) Solution of exhaust heat issues caused by increase and concentration of power consumption at a ground facility;

(2) Reduced ground processing load due to decrease in the amount of data on satellite information to be transmitted to the ground; Reduced ground processing load due to autonomous system management by a satellite constellation; and (3) Quicker handling upon an emergency.

The effect of (2) and (3): reduction in ground processing load, is that it decreases green house gas emission to contribute to SDGs on the ground.

<Collision Avoidance>

The satellite constellation 11 described in FIG. 11 or FIG. 13 is formed by a satellite group consisting of the artificial satellites on the respective orbital planes. In FIG. 14, the edge server 91 mounted on each mission satellites 20M stores orbit information for the satellite group constituting the satellite constellation 11. The computer 92 mounted on each mission satellites 20M analyzes a risk of collision between the artificial satellites constituting the satellite constellation 11 with artificial intelligence using the orbit information stored in the edge server 91.

In the satellite constellation 11 in which satellites fly at the same altitude on multiple orbital planes of different normal vectors, there is a risk of collision on a line of intersection of orbital planes. Thus, the edge servers 91 storing orbit information for the satellite group constituting the satellite constellation 11 and the computers 92 for analyzing a risk of collision between satellites are deployed among the constituent satellites of the communication satellite system. If there is any satellite for which a collision is expected from an analysis result, the computer 92 gives a command to operate a propulsion device on that satellite on the orbit. This can avoid a collision between satellites to ensure flight safety.

<Transmission of Flying Object Information>

The satellite constellation 11 is formed by a satellite group consisting of artificial satellites on the respective orbital planes. The satellite group constituting the satellite constellation 11 can include surveillance satellites on which a monitoring device for acquiring flying object information is mounted. Although FIG. 14 shows all the satellites as being mission satellites 20M, surveillance satellites equipped with monitoring devices are deployed among them. The edge server 91 mounted on each mission satellite 20M stores orbit information for the satellite group constituting the satellite constellation 11 and flying object information acquired by surveillance satellites.

The computer 92 mounted on each mission satellite 20M transmits the flying object information stored in the edge server 91 to the artificial satellites constituting the satellite constellation 11 over an annular communication network or a mesh communication network by referencing the orbit information.

The surveillance satellites equipped with a monitoring device as the mission device acquires launch detection information for a flying object and transmits the launch detection information to the satellites equipped with the edge servers 91. The computer 92 on a satellite equipped with the edge server 91 selects a surveillance satellite that can track and monitor the flying object by referencing the flying object information and orbit information, and transmits the flying object information to the selected surveillance satellite. This enables flying object tracking.

<Flying Path Prediction>

The satellite constellation 11 is formed by a satellite group consisting of the artificial satellites on the respective orbital planes.

The satellite group constituting the satellite constellation 11 can include multiple surveillance satellites on which monitoring devices for acquiring flying object information are mounted. Although FIG. 14 shows all the satellites as being mission satellites 20M, surveillance satellites equipped with monitoring devices are deployed among them. The edge server 91 mounted on each mission satellite 20M acquires and stores flying object information from multiple surveillance satellites, and also has stored preliminary information as flying object attribute information. The computer 92 mounted on each mission satellite 20M calculates a predicted flying path of a flying object by performing flying path analysis with artificial intelligence, using the flying object information and preliminary information stored in the edge server 91. The computer 92 transmits the flying object information stored in the edge server 91 to a surveillance satellite that can track the predicted flying path.

As the preliminary information, the edge server 91 stores a flying object model including flying object type, propellant type, a possible flight distance, and a typical flight profile. The edge server 91 acquires and stores tracking information for the flying object (flying object information) acquired by surveillance satellites equipped with monitoring devices as the mission devices from multiple satellites. The computer 92 performs flying path predictive analysis via inference by AI machine learning with reference to the flying object model, that is, the preliminary information. The computer 92 transmits flying object information to a surveillance satellite that can track a predicted flying path, which is a result of the flying path predictive analysis. This enables flying object tracking.

<Landing Prediction>

The satellite constellation 11 is formed by a satellite group consisting of the artificial satellites on the respective orbital planes. The satellite group constituting the satellite constellation 11 can include multiple surveillance satellites on which monitoring devices for acquiring flying object information are mounted. The edge server 91 mounted on each mission satellite 20M acquires and stores flying object information from multiple surveillance satellites, and also has stored preliminary information as flying object attribute information. The computer 92 mounted on the mission satellite 20M executes prediction of flying object landing with artificial intelligence using the flying object information and preliminary information stored in the edge server 91. From this landing prediction, the computer 92 selects a satellite that can transmit flying object information to a ground asset capable of handling from the satellite group constituting the satellite constellation 11 by referencing a result of prediction of flying object landing. The computer 92 makes the selected satellite transmit the flying object information to the ground asset capable of handling.

The edge server 91 stores information on locations where flying object handling assets are deployed as preliminary information, and the computer 92 estimates a landing location by machine learning and transmits flying object information to a ground asset located near the predicted landing location. This enables flying object handling.

<Data Center>

FIG. 15 shows the satellite constellation 11 including mission satellites 20M. In FIG. 15, the mission satellites 20M, which are artificial satellites equipped with a mission device, has at least either of a supercomputer 94 and a data center 95 mounted thereon as the mission device.

Along with an increasing amount of information associated with development of an information society, increased power consumption and measures against exhaust heat have been issues, and in a centralized mechanism in particular, power intensiveness and measures against exhaust heat of supercomputers and large-scale data centers have become significant problems. In outer space, on the other hand, heat can be discharged into deep space by radiation cooling. Accordingly, the mission satellites 20M equipped with the supercomputers 94 and the data centers 95 for implementing a cloud environment are deployed on the satellite constellation 11 side. Then, after the supercomputers 94 or the data centers 95 performed computational processing on the orbits, the mission satellites 20M transmit only necessary data to user terminals 93 on the ground or to the ground data center 511. This has the effect of maintaining the cloud environment and contributing to SDGs on the ground. According to the communication satellite system 10 of FIG. 11 or FIG. 13, satellites and certain ground users can send and receive information by way of the annular communication network or the mesh communication network. Also, distributed computing where the satellites constituting the communication satellite system 10 are considered as IoTs has the effect of being able to achieve unified data management with low latency.

<Ground Facility 510>

FIG. 16 shows a location of the ground facility 510. The ground facility 510 is equipped with at least either of the supercomputer 94 and the data center 95. The ground facility 510 is installed in a high latitude region at a latitude of 50 degrees or more, and sends and receives information via the communication satellite system 10.

As a supercomputer or computers making up a large-scale data center have high power consumption and generates much heat, they have been operated in a ground facility equipped with a large-scale cooling facility. It has an issue in that consumption of large electricity or exhaust heat to the outside is disadvantageous in terms of SDGs. As cloud computing is becoming more popular, locations where a supercomputer or a data center is installed is no longer a constraint for users; as long as fast communication lines are ensured, it is rational to deploy equipment that consumes large electricity and generates much heat in a high latitude region, or a cold area.

On the other hand, when an optical fiber communication network or the like is to be laid on the ground, routing a high capacity communication network from a high latitude region to a metropolitan area where users are concentrated has the issue of being disadvantageous in terms of cost. As opposed to this, a hybrid constellation which is formed at an orbit altitude of about 300 km, for example, and forms an annular or mesh communication network of optical communication terminals has the effect of facilitating provision of an information communication network from a high latitude region to a metropolitan area and also being preferable in terms of latency.

Since a polar orbit satellite passes over a polar region in every revolution, it has the effect of facilitating expansion of communication capacity for a high latitude region, including a polar region.

In an inclined orbit satellite as well, the forwarding direction of a satellite that moves northward from the south hemisphere changes at the northern extremity of the orbital plane to a direction in which the satellite flies from west to east and moves down southward from the north hemisphere, and the forwarding direction of a satellite that moves southward from the north hemisphere changes at the southern extremity of the orbital plane to a direction in which the satellite flies from west to east and moves up northward from the south hemisphere. So, an orbit with an orbital inclination of 50 degrees or more has the effect of facilitating expansion of the capacity of communication with a ground facility installed in a high latitude region, including the polar region, at the northern extremity and the southern extremity of the orbital plane in a region where the satellite flies from west to east.

Further, by limiting a communication line with a data center installed in a high latitude region, including the polar region, to a communication line with satellites having robust security measures and eliminating land lines, the effect of enabling construction of a data center with a robust security environment blocked from cyber attacks is provided.

REFERENCE SIGNS LIST

A, B, C, D, E, F, G, H, I: orbit; 1: annular communication network; 2: northern edge communication network; 3: southern edge communication network; 10: communication satellite system; 11: satellite constellation; 12: orbital plane; 20: communication satellite; 20M: mission satellite; 30: laterally-oriented satellite; 40: user satellite; 51: communication visual field; 51C: first communication device; 52: communication visual field; 52C: second communication device; 53: communication visual field; 53A: rightward communication direction; 53C: third communication device; 54: communication visual field; 54A: leftward communication direction; 54C: fourth communication device; 61C: ground communication device; 61: communication visual field; 71, 72, 73, 74: range; 62C: user satellite communication device; 62: communication visual field; 81: flying direction; 90: mission device; 91: edge server; 92: computer; 93: user terminal; 94: supercomputer; 95: data center; 510: ground facility; 511: ground data center; 520: earth-side control facility; 520A: processor; 520B: main storage device; 520C: auxiliary storage device; 520D: communication interface; 520E: signal line; 520F: communication antenna; 521: satellite control unit; 530: communication ground center; 600: the earth

The invention claimed is:

1. A communication satellite system comprising:

a plurality of artificial satellites that fly in inclined circular orbits of six or more orbital planes, respectively, the orbital planes having a common orbital inclination and having azimuth components of normal vectors of the orbital planes offset from each other in east-west direction, wherein the plurality of artificial satellites include eight or more artificial satellites on each of the orbital planes, each of the artificial satellites on each of the orbital planes includes a fore-aft communication device which is communication devices oriented forward in a flying direction on the orbital plane and rearward in the flying direction, each of the artificial satellites on each of the orbital planes forms a first communication network covering an entire circumference of the inclined circular orbit by forming cross-link communication with an artificial satellite flying in front in the flying direction and an artificial satellite flying behind in the flying direction via the fore-aft communication device, and each of the artificial satellites on each of the orbital planes passes over each of a northern edge of the inclined circular orbit and a southern edge of the inclined circular orbit in synchronization with artificial satellites on other orbital planes, forms a second communication network by forming, when passing over the northern edge of the inclined circular orbit, cross-link communication with artificial satellites passing over the northern edges of the inclined circular orbits that are contained in adjacent orbital planes via the fore-aft communication device, the adjacent orbital planes being orbital planes neighboring said orbital plane that contains said inclined circular orbit, and forms a third communication network by forming, when passing over the southern edge of the inclined circular orbit, cross-link communication with artificial satellites passing over the southern edges of the inclined circular orbits that are contained in the adjacent orbital planes via the fore-aft communication device.

2. The communication satellite system according to claim 1, wherein the orbital inclination is 40 degrees or more to 60 degrees or less.

3. The communication satellite system according to claim 1, wherein each of the artificial satellites on each of the orbital planes includes an air-to-ground communication device as a communication device to communicate with a ground facility that is provided in a range of a northern latitude of 40 degrees or more to a northern latitude of 60 degrees or less or in a range of a southern latitude of 40 degrees or more to a southern latitude of 60 degrees or less.

4. A ground facility installed in a high latitude region at a latitude of 50 degrees or more, wherein the ground facility communicates with the air-to-ground communication device via either of a second communication network and a third communication network, in the second communication network, when an artificial satellite forming the communication satellite system according to claim 3 passes over a northern edge of an inclined circular orbit, cross-link communication between the artificial satellite and artificial satellites passing over northern edges of inclined circular orbits that are contained in adjacent orbital planes is formed via the fore-aft communication device, the adjacent orbital planes being orbital planes neighboring an orbital plane that contains said inclined circular orbit, and in the third communication network, when an artificial satellite forming the communication satellite system according to claim 3 passes over a southern edge of an inclined circular orbit, cross-link communication between the artificial satellite and artificial satellites passing over southern edges of inclined circular orbits that are contained in the adjacent orbital planes is formed via the fore-aft communication device.

5. The communication satellite system according to claim 1, wherein the number of the eight or more artificial satellites flying on a same orbital plane is an odd number.

6. The communication satellite system according to claim 1, wherein the communication satellite system includes, among the eight or more artificial satellites, a laterally-oriented satellite equipped with a right-left communication device, the right-left communication device being communication devices oriented leftward in the flying direction and rightward in the flying direction, and the laterally-oriented satellite on each of the orbital planes communicates with the laterally-oriented satellite flying on the adjacent orbital plane on left in the flying direction and with the laterally-oriented satellite flying on the adjacent orbital plane on right in the flying direction via the right-left communication device.

7. The communication satellite system according to claim 6, wherein the fore-aft communication device is a radio wave communication device.

8. The communication satellite system according to claim 1, wherein the fore-aft communication device is an optical communication device.

9. The communication satellite system according to claim 1, wherein one or more artificial satellites of the plurality of artificial satellites include a mission device to perform a particular mission.

10. The communication satellite system according to claim 9, wherein a mission satellite as the artificial satellite including the mission device has an edge server and a computer equipped with artificial intelligence mounted thereon as the mission device, and executes edge computing on an orbit.

11. The communication satellite system according to claim 10, wherein a satellite constellation is formed by a satellite group consisting of artificial satellites on the respective orbital planes, the edge server mounted on the mission satellite stores orbit information for the satellite group constituting the satellite constellation, and the computer mounted on the mission satellite analyzes a risk of collision between the artificial satellites constituting the satellite constellation with the artificial intelligence using the orbit information.

12. The communication satellite system according to claim 10, wherein a satellite constellation is formed by a satellite group consisting of artificial satellites on the respective orbital planes, the satellite group constituting the satellite constellation includes a surveillance satellite on which a monitoring device to acquire flying object information is mounted, the edge server mounted on the mission satellite stores orbit information for the satellite group constituting the satellite constellation and flying object information acquired by the surveillance satellite, and the computer mounted on the mission satellite transmits the flying object information stored in the edge server to the artificial satellites constituting the satellite constellation by referencing the orbit information.

13. The communication satellite system according to claim 10, wherein a satellite constellation is formed by a satellite group consisting of artificial satellites on the respective orbital planes, the satellite group constituting the satellite constellation includes a plurality of surveillance satellites on which monitoring devices to acquire flying object information are mounted, the edge server mounted on the mission satellite acquires and stores the flying object information from the plurality of surveillance satellites, and also has stored preliminary information as flying object attribute information, and the computer mounted on the mission satellite calculates a predicted flying path of a flying object by performing flying path analysis with the artificial intelligence using the flying object information and the preliminary information stored in the edge server, and transmits the flying object information stored in the edge server to a surveillance satellite that can track the predicted flying path.

14. The communication satellite system according to claim 10, wherein a satellite constellation is formed by a satellite group consisting of artificial satellites on the respective orbital planes, the satellite group constituting the satellite constellation includes a plurality of surveillance satellites on which monitoring devices to acquire flying object information are mounted, the edge server mounted on the mission satellite acquires and stores the flying object information from the plurality of surveillance satellites, and also has stored preliminary information as flying object attribute information, and the computer mounted on the mission satellite executes prediction of flying object landing with the artificial intelligence using the flying object information and the preliminary information stored in the edge server, selects a satellite that can transmit flying object information to a ground asset capable of handling from the satellite group constituting the satellite constellation by referencing a result of prediction of flying object landing, and makes the selected satellite transmit the flying object information to the ground asset capable of handling.

15. The communication satellite system according to claim 9, wherein a mission satellite as the artificial satellite including the mission device has at least either of a supercomputer and a data center mounted thereon as the mission device.

16. An earth-side control facility deployed on the earth, the earth-side control facility comprising:

a satellite control unit to control the plurality of artificial satellites included in the communication satellite system according to claim 1, wherein the satellite control unit forms a second communication network by forming, when an artificial satellite passes over a northern edge of an inclined circular orbit, cross-link communication between the artificial satellite and artificial satellites passing over northern edges of inclined circular orbits that are contained in adjacent orbital planes via the fore-aft communication device, the adjacent orbital planes being orbital planes neighboring an orbital plane that contains said inclined circular orbit, and forms a third communication network by forming, when an artificial satellite passes over a southern edge of an inclined circular orbit, cross-link communication between the artificial satellite and artificial satellites passing over southern edges of inclined circular orbits that are contained in the adjacent orbital planes via the fore-aft communication device.

17. The artificial satellite according to claim 1, comprising:

a user communication device to communicate with a communication device of a user over a user communication line.

18. A communication ground center comprising:

a transmission route search device to select, as a transmission route for transmission information transmitted by at least one said artificial satellite of the plurality of artificial satellites included in the communication satellite system according to claim 1, one or more artificial satellites through which the transmission information is to be routed from among the plurality of artificial satellites, the routing being performed by either of when an artificial satellite passes over a northern edge of an inclined circular orbit, forming cross-link communication between the artificial satellite and artificial satellites passing over northern edges of inclined circular orbits that are contained in adjacent orbital planes via the fore-aft communication device, the adjacent orbital planes being orbital planes neighboring an orbital plane that contains said inclined circular orbit, and when an artificial satellite passes over a southern edge of an inclined circular orbit, forming cross-link communication between the artificial satellite and artificial satellites passing over southern edges of inclined circular orbits that are contained in the adjacent orbital planes via the fore-aft communication device.

19. A transmission route search device included in the communication ground center according to claim 18, wherein the transmission route search device searches for an optimal route as a transmission route with a shortest transmission time and determines a time of transmission of the transmission information by each artificial satellite included in the optimal route, by taking, as input, a transmission start time of the transmission information, position information for a source of the transmission information, and position information for a destination of the transmission information.

20. A ground facility installed in a high latitude region at a latitude of 50 degrees or more and equipped with at least either of a supercomputer and a data center, wherein the ground facility sends and receives information via either of a communication network in which, when an artificial satellite forming the communication satellite system according to claim 1 passes over a northern edge of an inclined circular orbit, cross-link communication between the artificial satellite and artificial satellites passing over northern edges of inclined circular orbits that are contained in adjacent orbital planes is formed via the fore-aft communication device, the adjacent orbital planes being orbital planes neighboring an orbital plane that contains said inclined circular orbit, and a communication network in which, when an artificial satellite forming the communication satellite system according to claim 1 passes over a southern edge of an inclined circular orbit, cross-link communication between the artificial satellite and artificial satellites passing over southern edges of inclined circular orbits that are contained in the adjacent orbital planes is formed via the fore-aft communication device.

* * * * *